United States Patent [19]
Yamaguchi

[11] Patent Number: 5,806,617
[45] Date of Patent: Sep. 15, 1998

[54] HYBRID VEHICLE

[75] Inventor: Kozo Yamaguchi, Aichi-ken, Japan

[73] Assignee: Kabushikikaisha Equos Research, Japan

[21] Appl. No.: 634,303

[22] Filed: Apr. 16, 1996

[30]   Foreign Application Priority Data

Apr. 20, 1995   [JP]   Japan .................................. 7-119372

[51] Int. Cl.⁶ .................................................. B60K 1/00
[52] U.S. Cl. ...................... 180/65.2; 180/65.4; 180/65.3; 475/5
[58] Field of Search ................................ 180/65.2, 65.4, 180/65.3, 65.6, 65.7; 475/5, 1; 74/661

[56]   References Cited

U.S. PATENT DOCUMENTS

| | | | |
|---|---|---|---|
| 3,566,717 | 3/1971 | Berman et al. | 180/65.2 |
| 3,650,345 | 3/1972 | Yardney | 180/65.2 |
| 4,042,056 | 8/1977 | Horwinski | 180/65.2 |
| 4,351,405 | 9/1982 | Fields et al. | 180/65.2 |
| 4,753,078 | 6/1988 | Gardner, Jr. | 60/668 |
| 5,115,183 | 5/1992 | Kyoukane et al. | 320/61 |
| 5,343,970 | 9/1994 | Severinsky | 180/65.2 |
| 5,427,196 | 6/1995 | Yamaguchi et al. | 180/65.2 |
| 5,495,912 | 3/1996 | Gray, Jr. et al. | 180/165 |
| 5,513,719 | 5/1996 | Moroto et al. | 180/65.4 |
| 5,558,588 | 9/1996 | Schmidt | 475/5 |
| 5,577,973 | 11/1996 | Schmidt | 475/5 |
| 5,588,498 | 12/1996 | Kitada | 180/65.4 |
| 5,643,119 | 7/1997 | Yamaguchi et al. | 475/5 |
| 5,667,029 | 9/1997 | Urban et al. | 180/65.2 |
| 5,697,466 | 12/1997 | Moroto et al. | 180/65.2 |
| 5,720,690 | 2/1998 | Hara et al. | 477/20 |
| 5,722,502 | 3/1998 | Kubo | 180/65.4 |

*Primary Examiner*—Richard M. Camby
*Assistant Examiner*—Bridget Avery
*Attorney, Agent, or Firm*—Lorusso & Loud

[57]   ABSTRACT

A hybrid vehicle in which an engine can always be driven in a highly efficient region in accordance with the required running load. An engine torque of a combustion engine 2, in which an efficiency characteristic can be selected from those in a lean state and in a stoichiometric state, and a motor torque of a generator/motor 3 are transmitted to a driving output system as a driving torque. The combustion engine 2 is always operated in the most efficient state in each efficiency characteristic which is selected, and a vehicle control device 10 adjusts the motor torque by controlling the generator/motor 3 in accordance with the degree an accelerator opens, selects an efficiency characteristic in accordance with the required running load based upon the required running load input by a required running load detecting means, and amends the engine torque variance which is generated when the efficiency characteristic changes with the motor torque.

16 Claims, 15 Drawing Sheets

HYBRID VEHICLE

BACKGROUND OF THE INVENTION

1. Field of the Invention

The present invention relates to a hybrid vehicle and more particularly to a hybrid vehicle which has an engine loaded therein and which drives with high efficiency.

2. Description of Related Art

Conventionally, a hybrid vehicle having a driving device in which an engine and a motor are used has been provided.

Various kinds of this type of hybrid vehicle have been provided, and these vehicles are classified into a series (direct) type of hybrid vehicle in which electric energy is generated by a generator driven by the engine and the motor is rotated by the electric energy with the rotation transmitted to the driving wheels, and a parallel type of hybrid vehicle in which the driving wheels are directly rotated by the engine and the motor, and so on.

In the series type of hybrid vehicle, the engine is operated at a fixed point in a highly efficient region. In the parallel type of hybrid vehicle, when a required running load is heavy, motor torque supplements engine torque, and when a required runnung load is light, part of the engine torque is used as driving torque for the motor to regenerate electricity and the engine is always operated in a highly efficient region.

When the engine that is loaded is always operated in a highly efficient region, the following disadvantages occur.

When driving a vehicle, the engine with a large exhaust capacity is efficient when the required running load is heavy, and the engine with a small exhaust capacity is efficient when the required running load is light.

In other words, in an engine with a large exhaust capacity selected for high speed driving in which the load is heavy and for driving on an upward slope, the highly efficient region can't be attained when running on city streets on which the vehicle runs most frequently, and therefore, the fuel consumption increases.

In an engine with a small exhaust capacity selected for running on city streets, the highly efficient region can't be attained when running at a high speed or on an upward slope in which the load is heavy. In this case, the engine can be designed for sacrificing a reduction in the fuel consumption, and the engine has to be kept rotating at an extremely high speed, with the result that it becomes noisy and the life of the engine becomes short.

In a parallel type of hybrid vehicle, in which the output of the engine is directly transmitted to the driving wheels, the above-described disadvantages directly occur.

These disadvantages also occur in the above-described series type of hybrid vehicle. In the case of the series type of hybrid vehicle, when the required running load becomes heavylarge, the output of the motor needs to be increased, and in order to do this, the electric power supplied to the motor has to be increased. Indirectly, the output of the engine which drives the generator has to be increased. Accordingly, even in the case of the series type of hybrid vehicle, it is difficult to always drive the engine in the highly efficient region.

An object of the present invention is to provide a hybrid vehicle in which the engine loaded therein can always be driven in the most efficient driving state.

SUMMARY OF THE INVENTION

An object described above is attained by the present invention described below.

(1) A hybrid vehicle including a combustion engine having plural engine speed-torque characteristics selected by a command signal, an electric motor, an electricity storage means electrically connected to the electric motor, an output shaft connected to the engine and the electric motor, a required running load detecting means for detecting a required running load, an engine controlling means for changing the engine speed-torque characteristic in accordance with a detected value detected by the required running load detecting means, and a motor controlling means for compensating an output torque variance which occurs as the engine speed-torque characteristic is changed by the engine controlling means.

(2) The hybrid vehicle described in (1), in which the above-described electricity storage means supplies the electric motor with electric power and stores part of, or the entire engine output as regenerative energy from the electric motor.

(3) The hybrid vehicle described in (1), in which a clutch is positioned between the above-described engine and output shaft.

(4) The hybrid vehicle described in (1), in which the load detected by the above-described required running load detecting means is at least one of the following: the state of charge of the electricity storage means, vehicle speed, the degree the accelerator opens, a motor output value, and an electricity storage means output value.

(5) The hybrid vehicle described in (1), in which the above-described required running load detecting means detects the state of charge of the electricity storage means as the first load, and detects at least one of the following: the vehicle speed, the degree the accelerator opens, a motor output, an electricity storage means output, a motor output accumulating value, and an electricity storage means accumulating value as the second load, and in which the above-described engine controlling means changes the engine speed-torque characteristic of the above-described combustion engine when the detected value of the above-described second load is over a threshold and changes the above-described threshold based upon the detected value of the above-described first load.

(6) The hybrid vehicle described in (1), in which the above-described engine controlling means changes the engine speed-torque characteristic by changing an air fuel ratio of a mixed gas consisting of fuel and air supplied to the above-described internal combustion engine.

(7) The hybrid vehicle described in (6), in which the air fuel ratio is increased by decreasing the above-described fuel in accordance with the increased amount of the state of charge of the above-described electricity storage means.

(8) The hybrid vehicle described in (6), in which an air fuel ratio is changed in accordance with the detected value detected by the above-described required running load detecting means.

(9) The hybrid vehicle described in (5), in which a threshold based upon the detected value of the above-described load is changed to be the higher value in accordance with the increased value of the detected value of the above-described first load.

(10) The hybrid vehicle described in (1), in which the above-described internal-combustion engine is a variable displacement engine.

(11) The hybrid vehicle described in (1), in which the above-described internal-combustion engine has a variable valve mechanism.

(12) The hybrid vehicle described in (1), in which a generator to which a part of the engine output energy is transmitted is included, and energy generated by the above-described generator is stored in the above-described electricity storage means.

(13) The hybrid vehicle described in (12), further including a differential gear system connecting a first element to the above-described engine, a second element to the above-described generator, and a third element to the above-described electric motor and the above-described output shaft.

In the hybrid vehicle of the invention described in Claim 1, the combustion engine has plural engine speed-torque characteristics which are selected by a command signal and the electricity storage means is electrically connected to the electric motor. The output shaft is connected to the above-described engine and the above-described electric motor. The required running load is detected by the required running load detecting means. The engine controlling means changes the engine speed-torque characteristic in accordance with a detected value detected by the above-described required running load detecting means. The motor controlling means compensates an output torque variance which occurs as the engine speed-torque characteristic is changed by the above-described engine controlling means.

In the invention described in Claim 2, the above-described electricity storage means may supply the electric motor with electric power and may store part of, or the entire engine output as regenerative energy from the electric motor in the hybrid vehicle in Claim 1.

In the invention described in Claim 3, the clutch may be positioned between the above-described engine and output shaft in the hybrid vehicle in Claim 1.

In the invention described in Claim 4, the load detected by the above-described required running load detecting means may be at least one of the following: the state of charge of the electricity storage means, vehicle speed, the degree the accelerator opens, a motor output value, and an electricity storage means output value in the hybrid vehicle in Claim 1.

In the invention described in Claim 5, the above-described required running load detecting means may detect the state of charge of the electricity storage means as the first load, and may detect at least one of the followig: the vehicle speed, the degree the accelerator opens, a motor output, an electricity storage means output, a motor output accumulating value, and an electricity storage means accumulating value as the second load, and the above-described engine controlling means may change the engine speed-torque characteristic of the above-described combustion engine when the detected value of the above-described second load is over a threshold and may change the above-described threshold based upon the detected value of the above-describe first load in the hybrid vehicle in Claim 1.

In the invention described in Claim 6, the above-described engine controlling means may change the engine speed-torque characteristic by changing the air fuel ratio of a mixed gas consisting of fuel and air supplied to the above-described internal combustion engine in the hybrid vehicle in Claim 1.

In the invention described in Claim 7, an air fuel ratio may be increased by decreasing the above-described fuel in accordance with the increased amount of the state of charge of the above-described electricity storage means in the hybrid vehicle in Claim 6.

In the invention described in Claim 8, the above-described air fuel ratio may be changed in accordance with the detected value detected by the above-described required running load detecting means in the hybrid vehicle in Claim 6.

In the invention described in Claim 9, a threshold based upon the detected value of the above-described second load may be changed to be the higher value in accordance with the increased value of the detected value of the above-described first load in the hybrid vehicle in Claim 5.

In the invention described in Claim 10, the above-described internal-combustion engine may be a variable displacement engine in the hybrid vehicle in Claim 1.

In the invention described in Claim 11, the above-described internal-combustion engine may have a variable valve mechanism in the hybrid vehicle in Claim 1.

In the invention described in Claim 12, a generator to which a part of the engine's energy output is transmitted may be included, and energy generated by the above-described generator may be stored in the above-described electricity storage means in the hybrid vehicle in Claim 1.

The invention described in Claim 13 may further include a differential gear system connecting a first element to the above-described engine, a second element to the above-described generator, and a third element to the above-described electric motor and the above-described output shaft in the hybrid vehicle in Claim 12.

BRIEF DESCRIPTION OF THE DRAWINGS

FIG. 2 is a graph showing the relationship among the air/fuel ratio, the engine torque, the torque variance and so on;

DETAILED DESCRIPTION OF THE PREFERRED EMBODIMENT(S)

Figure 1:
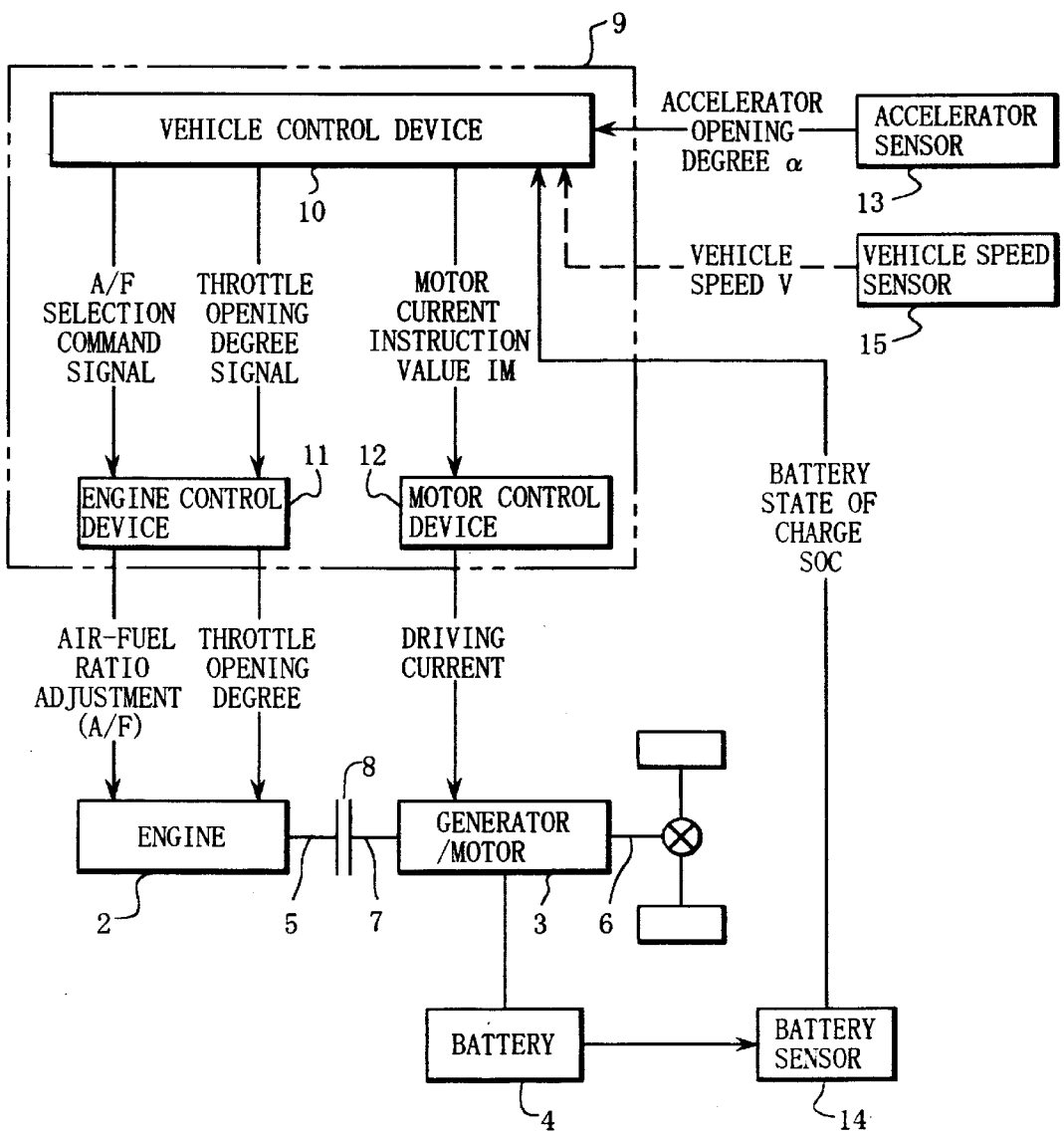
FIG. 1 is a block diagram of the arrangement of the control system of the hybrid vehicle.

Certain terminology will be used in the following description for convenience in reference only and will not be limiting. The words "up", "down", "right" and "left" will designate directions in the drawings to which reference is made. The words in" and "out" will refer to directions toward and away from, respectively, the geometric center of the device and designated parts thereof. Such terminology will include derivatives and words of similar import.

A preferable embodiment will now be described with reference to the attached drawings.

FIG. 1 depicts the first embodiment of the present invention, and is a block diagram illustrating a control system of a hybrid vehicle 1. The hybrid vehicle 1 includes an engine 2 defined by an internal-combustion engine and an external-combustion engine, a generator/motor 3 which generates electricity by an engine torque generated by the engine 2 and which generates motor torque, receiving driven electric power, a battery 4 as a electricity storage means for supplying the generator/motor 3 with motor driven electric power, an engine output shaft 5, a driving output system 6 ultimately transmitting a driving torque to driving wheels, and a clutch 8 provided between an output shaft 7 of the generator/motor 3 and the output shaft 5 of the engine 2, and further has a control system 9 which controls the functionings of the above-described engine 2 and the generator/motor 3.

Engine 2 can change the efficiency characteristic in such a way that the efficiency is maximized when the output is high and the efficiency becomes maximized when the output is low, and in the case of the present invention, a lean burn engine which can select a number of efficiency characteristics by changing an air-fuel ratio is used. In the vehicle of this embodiment, the air-fuel ratio of the mixed gas (mixed gas consists of fuel and air) which burns is set so as to be able to change into two states, that is, a theoretical air-fuel ratio state (hereinafter called "stoichiometric") and a lean mixed gas state (hereinafter called "lean"), and each state has a different efficiency characteristic. The state of the engine driven with a stoichiometric air-fuel ratio is hereinafter defined as a stoichiometric state, and the state of the engine driven with a lean air-fuel ratio is defined as a lean state.

Figure 2:
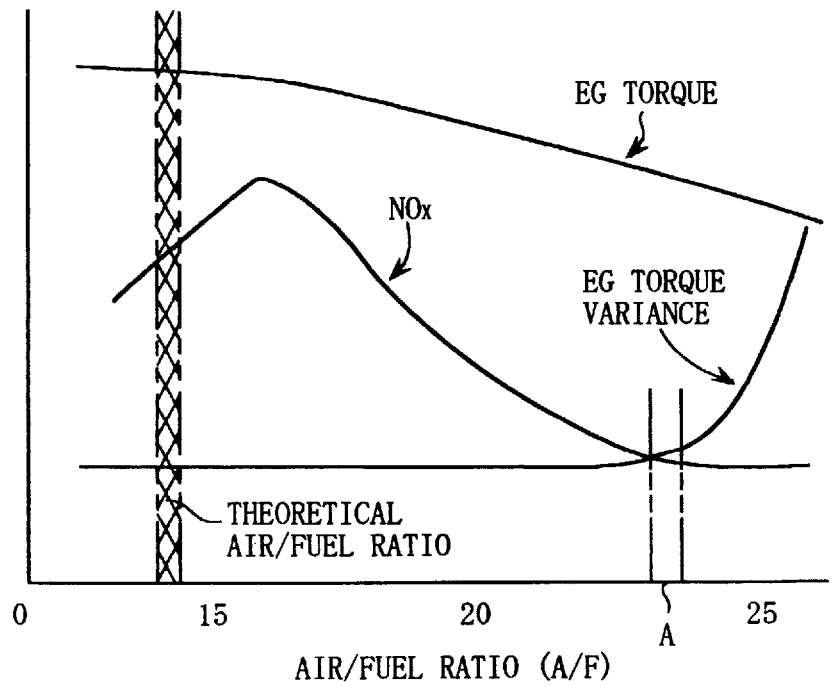

As FIG. 2 depicts, the air-fuel ratio of the mixed gas which is in a lean state is set within, for example, the range (A) of 22 to 23 which is just before the engine torque variance exceeds the allowable value. This range is hereinafter defined as a lean region, and in the same way, in FIG. 2, the region in which the air-fuel ratio is near the theoretical air-fuel ratio is defined as a stoichiometric region.

Figure 3:
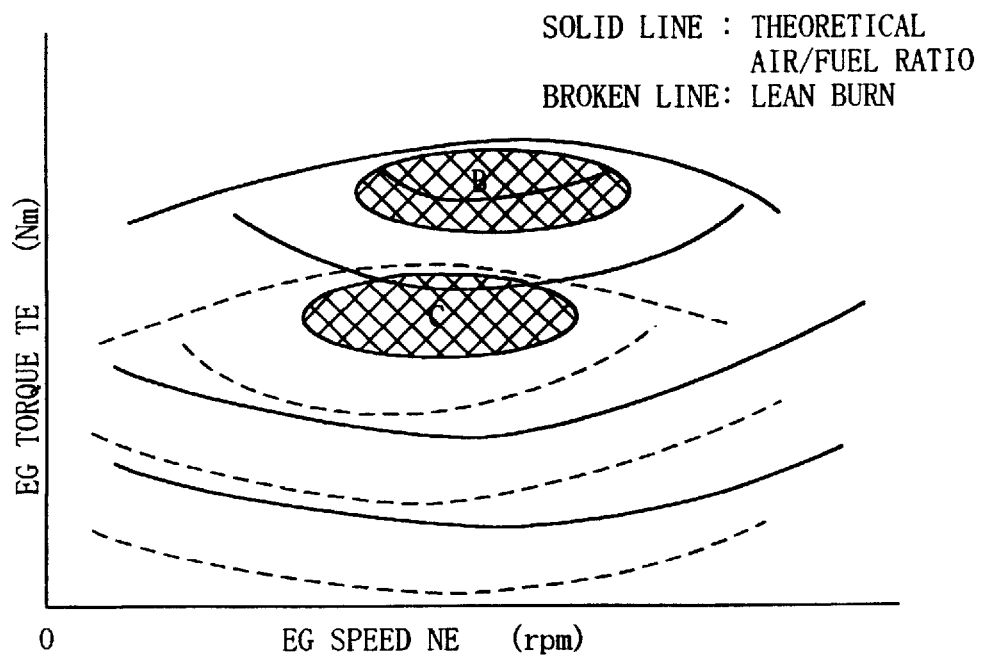
FIG. 3 is a conception diagram showing the maximum efficiency of the engine.

FIG. 3 is a diagram of the general idea of the engine 2 arranging this embodiment. In the engine 2, the output is controlled so that the engine torque and engine speed are within the range (B) when the output is high and the engine torque and engine speed are within the range (C) when the output is low.

The generator/motor 3 generates the motor torque when supplied with driven electric power from the battery 4, and generates a regenerative current when absorbing the driven power from the output shaft 7. The motor torque is controlled by, for example, a change in the amount of the driven current.

The clutch 8 selectively connects the output shaft 7 of the generator/motor 3 and the output shaft 5 of the engine 2. When the engine torque is outputted and the generator/motor 3 outputs the motor torque, the torque, which is a total of the engine torque and the motor torque, is outputted to the driving output system 6. In the state in which the clutch 8 is connected, when the generator/motor 3 acts as a generator, part of the engine torque is inputted to the output shaft 7 and the generator/motor 3 generates a regenerative current. In the state in which the clutch 8 is released, only the motor torque is transmitted to the driving output system 6.

Next, the control system 9 will be described. The control system 9 includes a vehicle control device 10, an engine control device 11 and a motor control device 12 which are control means.

Each control device 10, 11, and 12 is defined by a micro computer including, for example, CPU (Central Processing Unit), ROM (Read Only Memory) in which each kind of program and data is loaded, RAM (Random Access Memory) used as a working area, and so on.

The vehicle control device 10 controls a driving output ultimately transmitted to the driving output system 6. The torque is controlled so that the driving torque ultimately transmitted to the driving output system 6 is determined based upon the degree the accelerator opens which is inputted from an accelerator sensor 13 and the determined torque is transmitted to the driving output system 6 by increasing the instruction value of the motor current IM.

When the engine control device 11 receives a throttle opening degree signal input from the vehicle control device 10, the engine control device 11 adjusts the degree the throttle opens in accordance with the signal, and controls the engine output. When the engine control device 11 receives an air/fuel ratio (A/F) selection instruction signal, it selects either the lean air/fuel ratio or the stoichiometric air/fuel ratio, and controls the efficiency characteristic.

The motor control device 12, when receiving the instruction value of the motor current IM inputted from the vehicle control device 10, adjusts the driving current supplied from the battery 4 and controls the motor torque of the generator/motor 3. When the motor control device 12 receives the regenerative current instruction value inputted from the vehicle control device 10, the regenerative current flows from the generator/motor 3 to the battery 4.

Meanwhile, when the detected value of the required running load inputted from a required running load detecting means reaches a specified threshold, the vehicle control device 10 selects the most suitable engine efficiency characteristic corresponding to the detected required running load. Further, the vehicle control device 10 determines the most efficient engine torque in each selected efficiency characteristic, and determines the motor torque so as to amend the engine torque variance which is generated when the efficiency characteristic is changed.

The vehicle control device 10 outputs the air/fuel ratio selection instruction signal, instructing the air/fuel ratio which achieves a selected efficiency characteristic, and the throttle opening degree signal, instructing the degree the throttle opens corresponding to the above-described determined engine torque, to the engine control device 11. That is, the efficiency characteristic of the engine 2 is changed by the above-described air/fuel ratio selection instruction signal through the engine control device 11.

Further, the vehicle control device 10 outputs the instruction value of the motor current IM corresponding to the above-described determined motor torque to the motor control device 12.

The controls are conducted, for example, when the engine torque is reduced as a result of a change in the efficiency characteristic, the instruction value of the motor current IM is increased in order to amend the reduced output, and when the engine torque is increased as a result of a change in the efficiency characteristic, the motor current instruction value IM is reduced in order to amend the increased output. When more output than required can be obtained by just the engine torque as a result of a change in the efficiency characteristic, the regenerative current instruction value is output so that the generative current is generated by driving the generator/motor 3 by the surplus engine torque.

In this way, the engine 2 is always driven in the most effective region in each efficiency characteristic, and the torque ultimately transmitted to the driving output system 6 does not vary.

As FIG. 2 depicts, in the case of the present invention, when driving ordinarily the engine 2 is driven in a lean state in which the NOX exhaust amount is small and the fuel consumption is less, and when driven at a high speed or driving on an upward slope with a heavy load the engine 2 is controlled to be driven in a stoichiometric state in which the engine torque is large. In a stoichiometric state, though the NOX exhaust amount from the engine increases, a ternary catalyst acts thereon and the NOX exhaust amount from the vehicle is reduced to be small. The engine 2 maintains the state with the highest driving efficiency and a fixed torque is always outputted in each state.

The controlling operations of the vehicle control device 10 of the above-described driving system will be more specifically described with reference to the time chart in FIG. 4 and the flow charts in FIG. 5 to FIG. 7.

Figure 4:
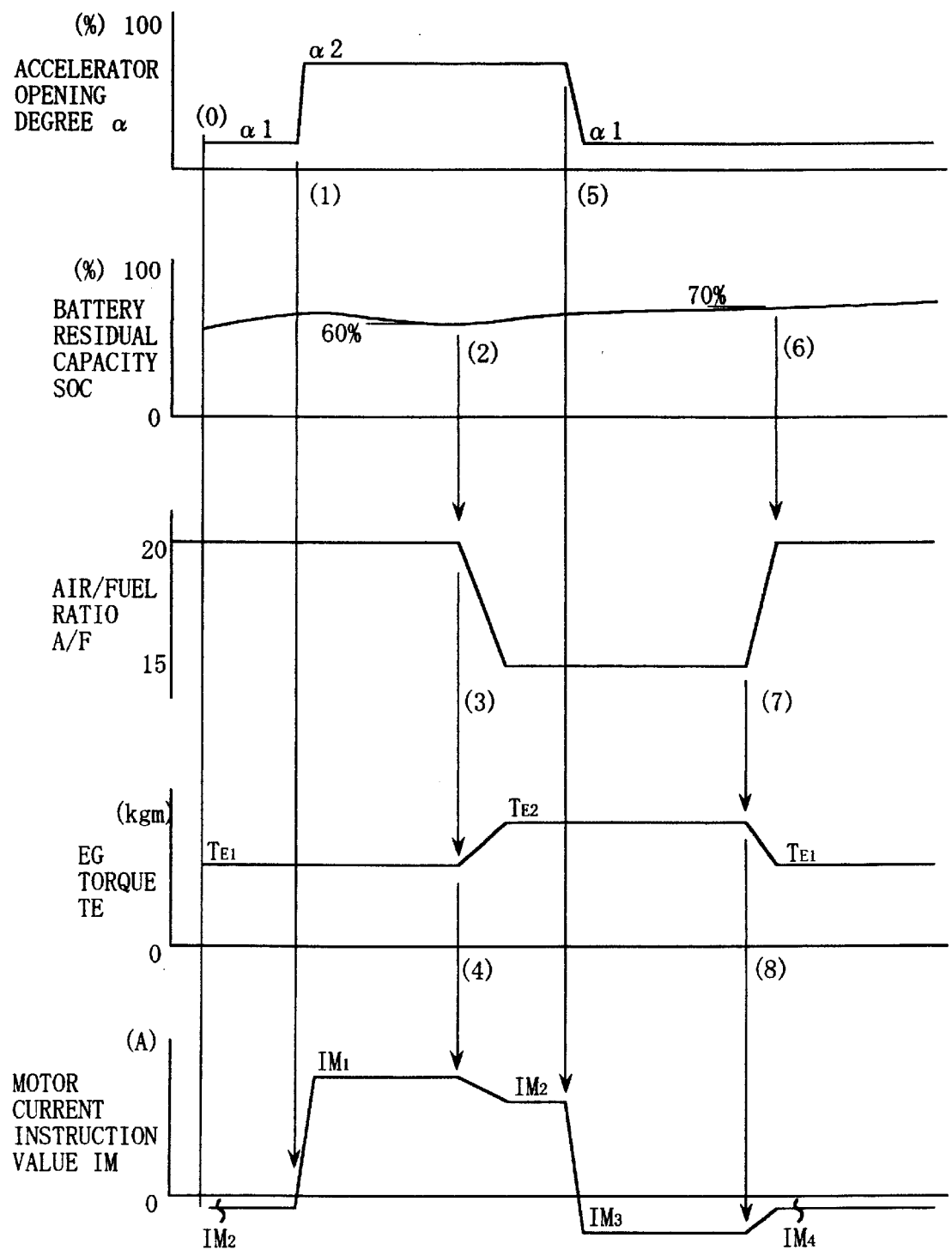
FIG. 4 is a time chart illustrating the control operation of the control system.

The position (0) in the time chart of FIG. 4 depicts the state in which a vehicle is running at a low speed on an ordinary road. With the value of the degree the accelerator opens, α, being low and the air/fuel ratio (A/F) of the mixed gas being lean, the engine 2 is driven by the most efficient torque in a lean state. The engine torque of this state fully supplies the driving torque of the driving output system, and the surplus engine torque drives the generator/motor 3 to flow the regenerative current from the generator/motor 3 to the battery 4.

Figure 5:
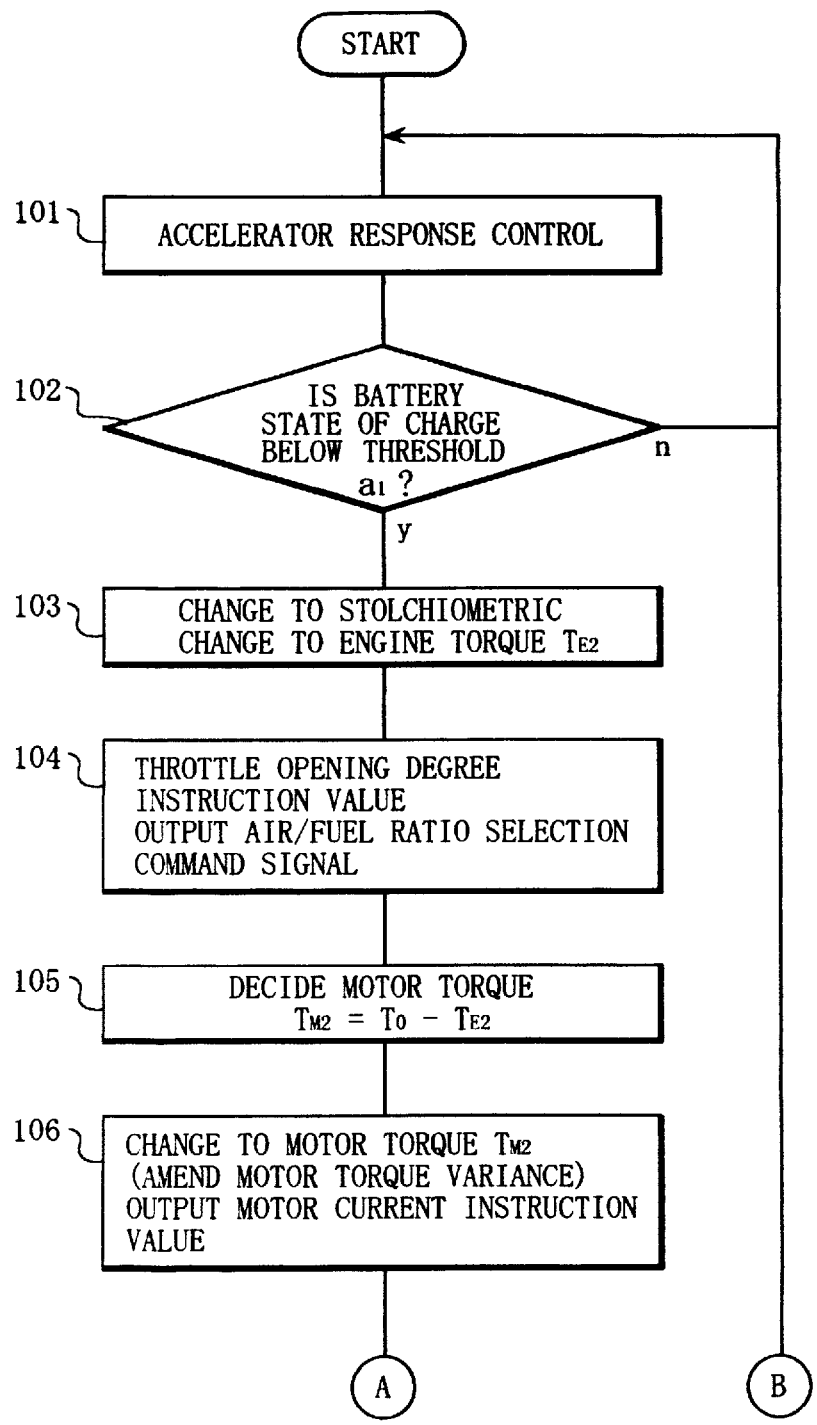
FIG. 5 is a flow chart illustrating the control operation of the control system.

When driving ordinarily like this, the accelerator response control is conducted as FIG. 5 illustrates (step 101). The accelerator response control is described based on FIG. 7. When the degree the accelerator opens, α, is inputted by the accelerator sensor 13 (step S11), the driving torque $T_O$ ultimately outputted to the driving output system is decided in order to give driving power in accordance with the degree the accelerator opens, α, to the driving wheels (step S12). Accordingly, the driving torque $T_O$ changes in accordance with the change of the value of the degree the accelerator opens, α.

In order to change the value of the motor torque $T_M$ following the change of the driving torque $T_O$, the motor torque $T_M$ is determined by subtracting the engine torque $T_E$ from the driving torque $T_O$ (step S13). In order to change the motor torque $T_{MO}$ to the motor torque $T_M$, the instruction value of the motor current IM is outputted (step S14).

The accelerator response control (step S11 to S14) is always conducted successively while running. As the position (1) in FIG. 4 depicts, when the accelerator pedal is stepped on and the degree the accelerator opens increases to change from $α_1$ to $α_2$, the instruction value of the motor current increases in accordance with the changing amount to change from $IM_O$ to $IM_1$. In this way, the driving torque in accordance with the degree the accelerator opens can be obtained.

In the present embodiment, the required running load detected is the battery state of charge SOC. The detected value detected from the battery sensor 14, which is a required running load detecting means, is determined whether it is less than the threshold $a_1$ (60%) or not (step 102). When it is more than 60%, the accelerator response control is continued. When the required running load increases as the driving torque $T_O$ increases as described above, the battery state of charge SOC decreases.

As the position (2) in FIG. 4 depicts, when the battery state of charge SOC becomes less than 60%, the air/fuel ratio supplied to the engine 2 is changed to be stoichiometric (the position (3) in FIG. 4), and the degree the throttle of the engine opens is determined as that which is the most efficient engine torque $T_{E2}$ can be outputted when the engine 2 drives in a stoichiometric state (step 103). The air/fuel ratio selection instruction signal and the throttle opening degree signal are output to the engine control device 11 based upon the determination of the step 103, with the efficiency characteristic of the engine 2 changed from lean to stoichiometric, and engine torque is changed from $T_{E1}$ to $T_{E2}$ (step 104).

Meanwhile, the value of the motor torque $T_{M1}$ is amended to be decreased so that the driving torque $T_O$ does not increase when the engine torque increases, that is, so that the driving torque $T_O$ which should be determined in accordance with the degree the accelerator opens does not vary by changing the efficiency characteristic of the engine.

That is to say, the value of the driving torque $T_O$ from which the engine torque $T_{E2}$ in a stoichiometric state is subtracted is determined as the amended motor torque $T_{M2}$ (step 105). The motor current instruction value IM2 set to change the motor torque to be $T_{M2}$, is outputted (step 106) (the position (4) in FIG. 4). As methods for amending the motor torque $T_{M1}$, the method in which the variance amount $\Delta T_E$ of the engine torque $T_{E1}$ is subtracted from the motor torque $T_{M1}$ (TM2=$T_{M1}$-$\Delta T_E$) may be used.

When the degree the accelerator opens decreases from $α_2$ to $α_1$, the motor torque $T_{M2}$ decreases and the driving torque $T_O$ decreases by using the accelerator response control (step 107). At this time, the vehicle control device 10 reduces the motor instruction value from $IM_2$ to $IM_3$ and controls the motor torque $T_{M2}$ (the position (5) in FIG. 4).

When the motor torque $T_{M2}$ decreases, electricity is discharged from the generator/motor 3 to the battery 4, and the battery state of charge SOC increases.

Meanwhile, in a stoichiometric state, the battery state of charge SOC is determined whether it is more than the threshold $a_2$ (70%) or not (step 108). When it is less than 70%, the accelerator response control (step 107) is repeated. As the position (6) in FIG. 4 illustrates, when the battery state of charge SOC becomes more than 70%, the air-fuel ratio supplied to the engine 2 is changed to be lean, and the degree the throttle of the engine 2 opens is determined so that the most efficient engine torque $T_{E1}$ is outputted when the engine 2 drives in a lean state (step 109). Based upon the determination of the step 109, the air/fuel ratio selection instruction signal and the throttle opening degree signal are outputted to the engine control device 11, with the efficiency characteristic of the engine 2 changed to be lean from a stoichiometric state, and the engine torque is changed to $T_{E1}$ from $T_{E2}$ (step 110) (the position (7) in FIG. 4).

Meanwhile, the value of the motor torque $T_{M2}$ is amended to increase so that the driving torque $T_O$ does not decrease when the engine torque decreases, that is, so that the driving torque $T_O$ which should be determined in accordance with the degree the accelerator opens does not vary when the efficiency characteristic of the engine is changed.

In other words, the value of the driving torque $T_O$ from which the engine torque $T_{E3}$ is subtracted is determined as the motor torque $T_{M3}$ which is amended (step 111). The motor current instruction value $IM_4$ which is set so as to change the motor torque to be $T_{M3}$ is outputted (step 112) (the position (8) in FIG. 4).

As described in the above, the battery state of charge SOC detected as a required running load has hysteresis and has different thresholds $a_1$ and $a_2$ ($a_1 < a_2$) which are set respectively, when the battery state of charge decreases and when the battery state of charge increases so that hunting is prevented.

By the control operation as described above, the engine can always drive in the most efficient driving state in each efficiency characteristic, whether the required running load is heavy or light.

Next, the above-described control operation acts on the driving system of, for example, the hybrid vehicle which will be described next. The following is the description based upon FIG. 8.

Figure 8:
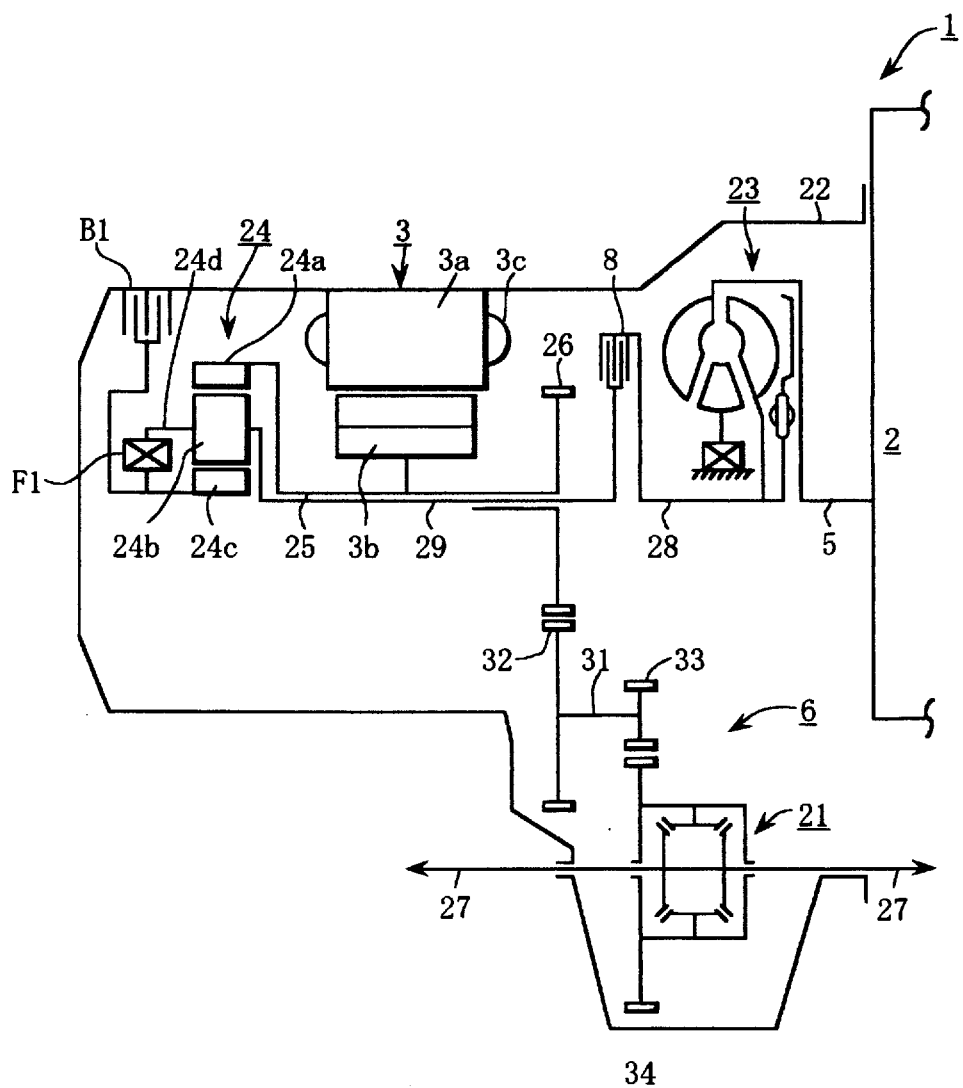
FIG. 8 is a diagram illustrating an example arrangement of the driving system of the hybrid vehicle of the present invention.

FIG. 8 depicts one example of the driving system of a FF. (Front engine and Front wheel drive) type vehicle. Conventionally, in FF. type vehicles, there have been FF. type vehicles which have engines whereby the rotational shafts are in a lateral direction, and FF. type vehicles which have engines so that the rotational shafts are in a longitudinal direction. In the above-described laterally positioned FF. vehicles, there are counter gear type vehicles which transmit the rotation of the engine to a differential device through a counter gear consisting of a counter drive gear and a counter driven gear, and chain type vehicles which transmit the rotation of the engine to the differential device through a chain. The above-described counter gear type vehicles are of a midway positioning type in which the counter gear is positioned at a midway point, and of a rear positioning type in which the counter gear is positioned at the rear end.

The arrangement illustrated in FIG. 8 is a laterally positioned FF. vehicle having the engine 2 so that the rotational shaft is in a lateral direction, and is a counter gear type transmitting the rotation of the engine 2 to a differential device 21 through the counter gear, and is a midway positioning type vehicle provided with the counter gear at a midway point. The present invention is also applicable for the types of vehicles other than the above-described types.

The driving system, other than the engine 2, is contained in a driving system case 22, and the driving system case 22 is provided with the generator/motor 3, the differential device 21, a torque converter 23, the clutch 8 always engaged when advancing, a planetary gear unit 24, a brake B1, and a one-way clutch F1 therein.

The generator/motor 3 has a stator 3a fixed in the driving system case 22, a rotor 3b connected to a transmission shaft 25. The stator 3a has a coil 3c coiled around it, and can rotate the rotor 3b by flowing the driving current to the coil 3c. The rotation of the above-described engine 2 and/or the generator/motor 3 is transmitted to a counter drive gear 26 fixed at the above-described transmission shaft 25.

A driving shaft 27, for transmitting the rotation slowed down and differentially moved by the differential device 21 to the driving wheels on the right and left, is provided so as to project at the differential device 21.

The planetary gear unit 24 is that of a simple planetary type, and includes a ring gear 24a, a pinion gear 24b, a sun gear 24c, and a carrier 24d supporting the pinion gear 24b.

The output shaft 5 of the engine 2 is connected to an input end of the torque converter 23, and an output shaft 28 of the torque converter 23 is connected to an input end of the clutch 8. An output end of the clutch 8 is connected to an input shaft 29 of the planetary gear unit 24, and the input shaft 29 is connected to the carrier 24d. The rotation of the sun gear 24c is selectively stopped by the brake B1. The one-way clutch F1 is provided between the sun gear 24c and the carrier 24d. One end of the transmission shaft 25 is connected to the ring gear 24a, and at the other end of the transmission shaft 25 the counter drive gear 26 is fixed.

Near the transmission shaft 25, a counter drive shaft 31 is positioned at the position parallel to the transmission shaft 25, and the counter drive shaft 31 is provided with a counter driven gear 32 and an output gear 33. The counter driven gear 32 is engaged in the above-described counter drive gear 26, and the rotation of the counter drive gear 26 is transmitted to the output gear 33.

The rotation of the output gear 33 is transmitted to a large output gear 34 engaged with the output gear 33. The number of teeth of the above-described large output gear 34 is more than that of the above-described output gear 33, and a final speed reducingmachine is defined by the above-described output gear 33 and large output gear 34. The rotation of the above-described output large gear 34 slowed down by the final speed reducing machine is transmitted to the differential device 21, differentially moved, and transmitted to the driving shafts 27 on the right and left. In the above-described arrangement, the driving output system 6 is defined by the counter drive shaft 31, the counter driven gear 32, the output gear 33, the large output gear 34, and the differential device 21.

In the defined driving system, as described above, when the engine 2 is moved without supplying the driving current to the above-described generator/motor 3, the rotation of the engine 2 is transmitted to the torque converter 23 through the output shaft 5, and further transmitted to the clutch 8 through the output shaft 28. When the clutch 8 is engaged, the rotation transmitted to the output shaft 28 is transmitted to the carrier 24d of the planetary gear unit 24 through the input shaft 29.

In the above-described planetary gear unit 24, when the brake B1 is released, the one-way clutch F1 is locked by the rotation input to the carrier 24d and is in a directly connected state. Accordingly, the rotation of the input shaft 29 is transmitted to the transmission shaft 25 intact. When the brake B1 is applied, the sun gear 24c is fixed, and the rotation, of which speed is increased, is outputted from the ring gear 24a and transmitted to the counter drive gear 26 through the transmission shaft 25.

As described in the above, the rotation transmitted to the counter drive gear 26 is transmitted to the counter drive shaft 31 through the counter driven gear 32 with its speed reduced by the final speed reducing machine defined by the output gear 33 and the large output gear 34. At this time, the vehicle can be driven only by the engine 2, and the regenerative current 1 can be generated in the generator/motor 3.

Next, when the clutch 8 is released and the generator/motor 3 is driven, the motor torque $T_M$ is generated in the generator/motor 3. The motor torque $T_M$ is outputted to the transmission shaft 25, and also transmitted to the counter drive gear 26. At this time, the vehicle can be driven by only the generator/motor 3.

When the above-described engine 2 is operated, with the clutch 8 engaged, and the generator/motor 3 is driven, the vehicle can be driven by the engine 2 and the generator/motor 3.

Next, an arrangement of the hybrid vehicle of the second embodiment will be described. In this embodiment, only the control operation of the control system is changed and the other arrangements are the same as those of the above-described first embodiment; therefore only the description of the control operation is described, and the other descriptions are abbreviated.

In the driving control of this embodiment, the stored required running load is detected as the first load, and two loads are detected as the second load loads from the momentary required running load or the stored required running loads other than the first load. When at least one of the detected values of the second load loads exceeds the threshold, a controlling mechanism is conducted so that the efficiency characteristic of the engine is changed.

This threshold continually varies based upon the detected value of the first load. In this embodiment, the battery state of charge (%) is detected as the stored required running load as the first load, and the degree the accelerator opens at a given time and hour (%) and the vehicle speed (km/h) are detected as the second load.

Figure 9:
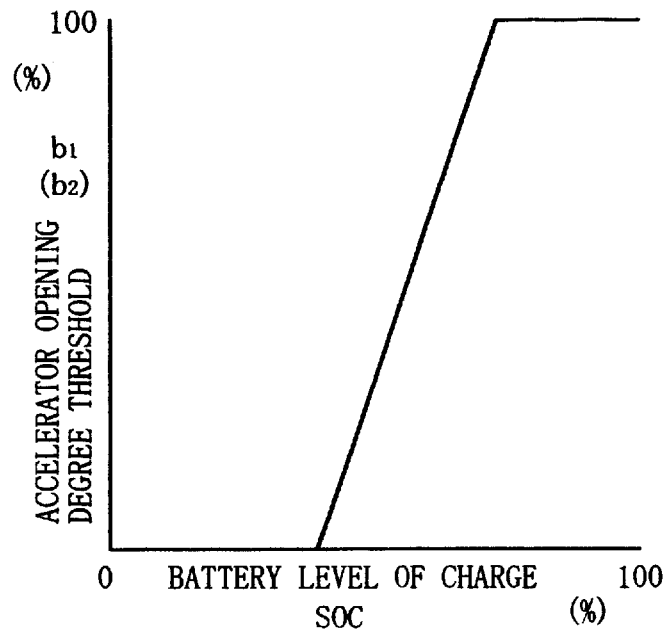
FIG. 9 is a graph illustrating the relationship between the battery state of charge SOC and the threshold $b_1$ ($b_2$) of the degree the accelerator opens $\alpha$.
Figure 10:
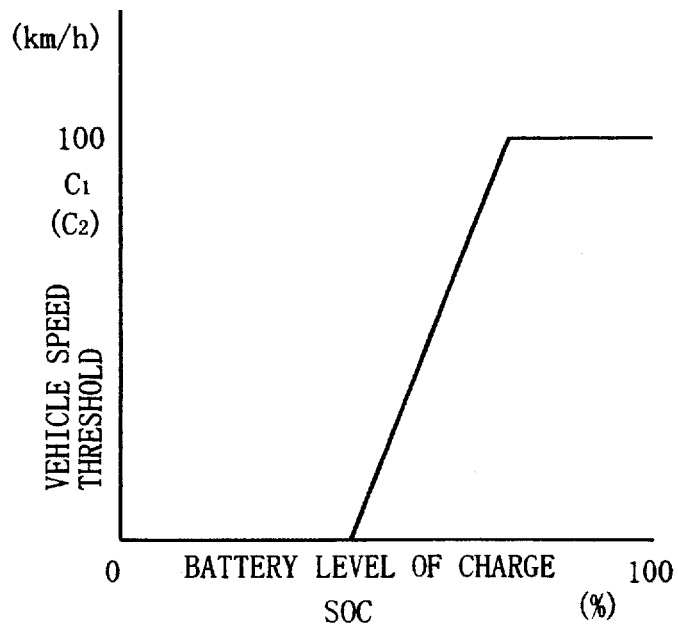
FIG. 10 is a graph illustrating the relationship between the battery state of charge SOC and the threshold $C_1$ ($C_2$) of the vehicle speed V.
Figure 11:
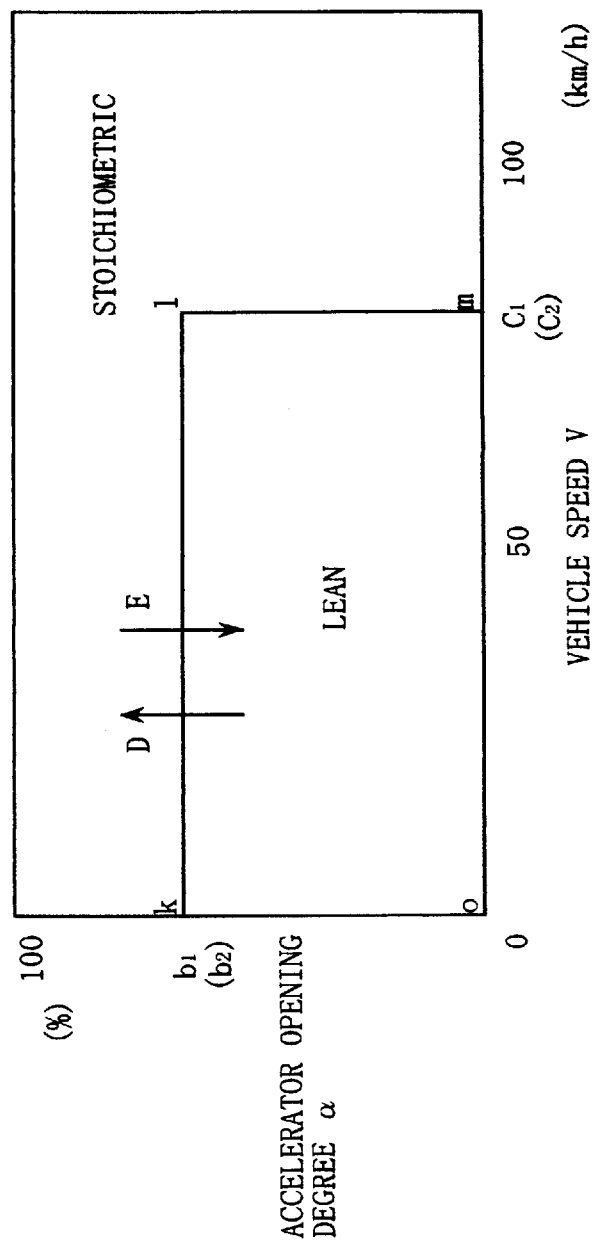
FIG. 11 is a diagram illustrating the thresholds of the degree the accelerator opens and the vehicle speed when the battery state of charge SOC has a certain value.

FIG. 9 and FIG. 10 are graphs depicting the relationship among the battery state of charge SOC, and each threshold b and c of the degree the accelerator opens α and the vehicle speed V. This function is previously memorized in the vehicle control device 10, and every time the detected battery state of charge SOC is inputted, the threshold b of the degree the accelerator opens and the threshold c of the vehicle speed are determined FIG. 11 is a diagram illustrating the thresholds when the battery state of charge SOC shows a certain value. When the degree the accelerator opens and the vehicle speed are located within the region illustrated by o-k-l-m in the diagram, the engine is in a lean state, and when they are located outside the region, it is in a stoichiometric state. The dimensional area of region o-k-l-m decreases as the battery state of charge SOC decreases, and it increases as the battery state of charge SOC increases.

The control operation of the control system of the second embodiment will be particularly described with reference to the time chart in FIG. 12, and the flow charts in FIG. 13 to FIG. 15.

Figure 13:
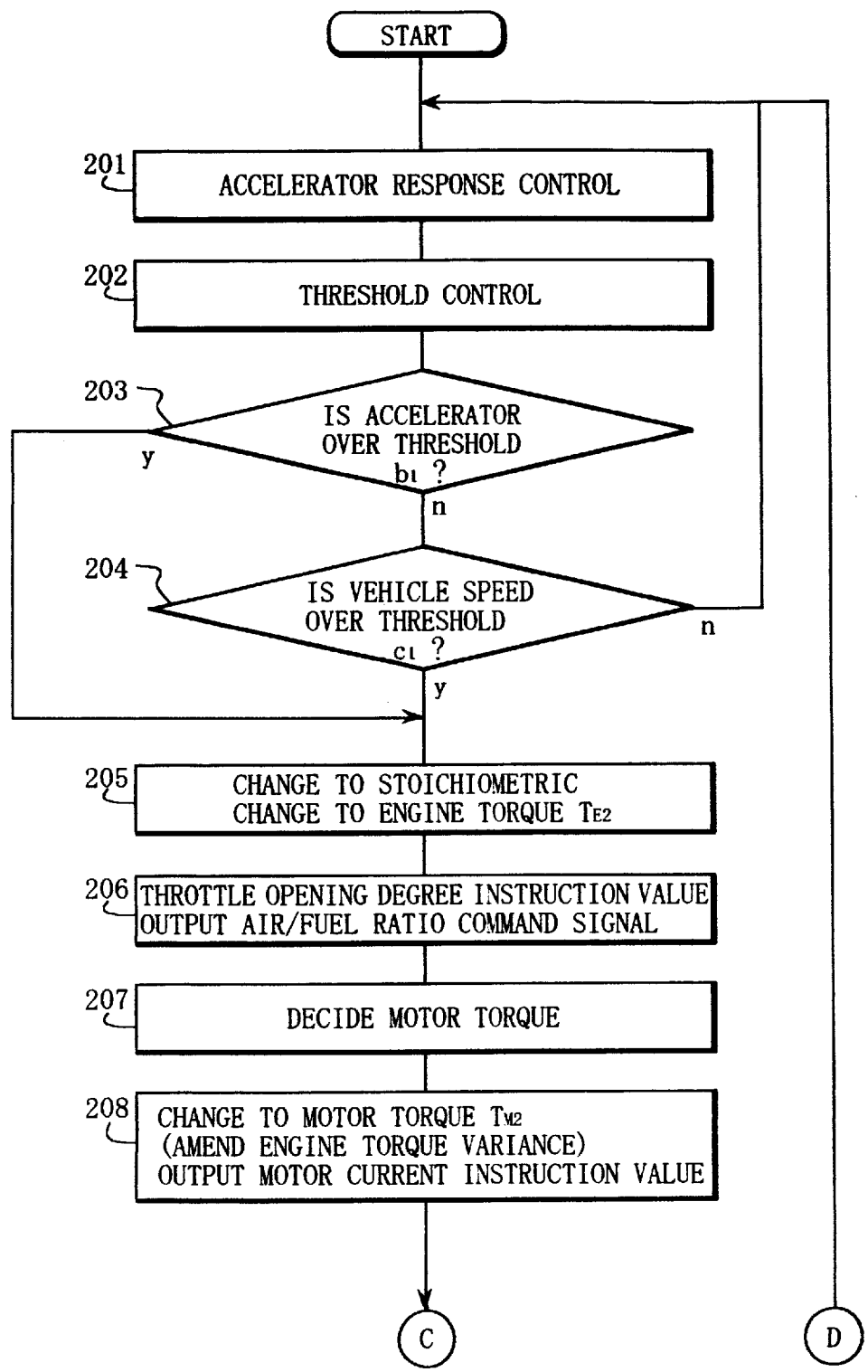
FIG. 13 is a flow chart illustrating the control operation of the control system.

In ordinary driving, the accelerator response control (step 201) and the threshold control (step 202) are conducted as FIG. 13 depicts. Since the operation of the accelerator response control is the same as that in the first embodiment, the description of it is abbreviated, and the threshold control will be described based upon FIG. 15. When the detected value detected from the battery sensor 14, which is a required running load detecting means, is inputted (step S21), the threshold of the degree the accelerator opens b and the vehicle speed threshold c are determined based upon the graphs illustrated in FIG. 9 and FIG. 10.

The accelerator response control (step S11 to S14) and the threshold control (step S21 to S 22) are always conducted successively while running. As illustrated at the position (1) in FIG. 12, when pressure is applied by stepping on the accelerator pedal and the degree the accelerator opens increases, the motor current instruction value IM increases corresponding to the increased amount.

The value of the degree the accelerator opens α detected from the accelerator sensor 13, is determined whether it is more than the threshold $b_1$ determined in the threshold control or not (step 203). When it is less than the threshold $b_1$, the value of the vehicle speed V, detected from the vehicle speed sensor 15, is determined whether it is more than the threshold $c_1$ or not (step 204). When it is less than the threshold $c_1$, the accelerator response control and the threshold control are continued.

Figure 12:
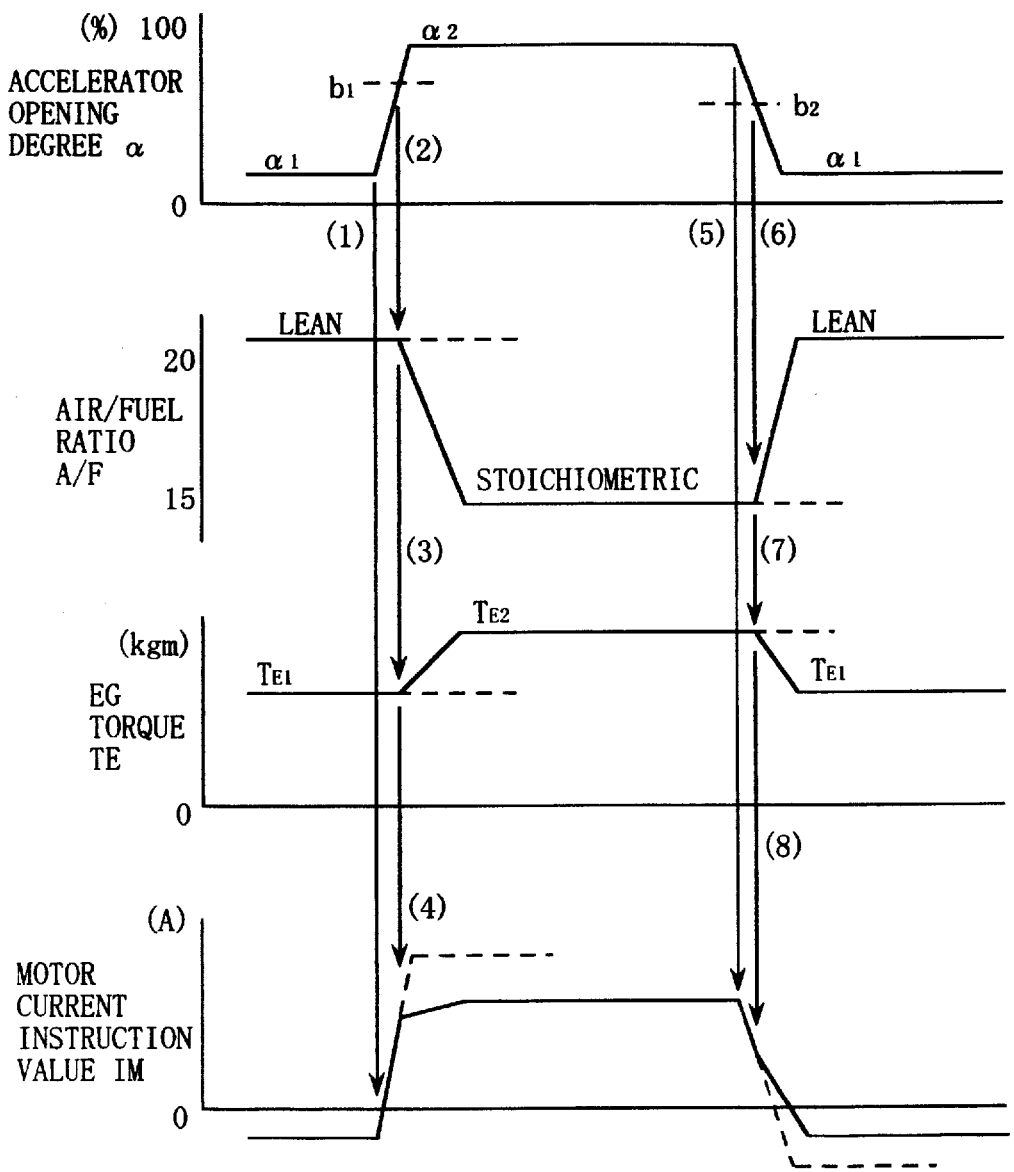
FIG. 12 is a time chart illustrating the control operation in the second embodiment.

In the step 203 and the step 204, when the degree the accelerator opens is more than the threshold bi, or the vehicle speed is more than the threshold $c_1$, the air/fuel ratio supplied to the engine 2 is changed to be stoichiometric (position (2) in FIG. 12), and the degree that the throttle of the engine opens is determined so that the most efficient engine torque $T_{E2}$ can be outputted when the engine 2 drives in a stoichiometric state (step 205). Based upon the determination of the step 205, the air/fuel ratio selection instruction signal and the throttle opening degree signal are outputted to the engine control device 11, with the efficiency characteristic of the engine 2 changed from a lean state to a stoichiometric state, and the engine torque is changed from $T_{E1}$ to $T_{E2}$ (step 206) (position (3) in FIG. 12).

Meanwhile, the value of the motor torque $T_{M1}$ is amended to decrease so that the driving torque $T_O$ does not increase when the engine torque increases, that is, so that the driving torque $T_O$ which should be determined according to the degree the accelerator opens does not vary when the efficiency characteristic of the engine changes.

That is to say, the value of the driving torque $T_O$ from which the engine torque $T_{E2}$ in a stoichiometric state is subtracted is determined as the amended motor torque $T_{M2}$ (step 207). The motor current instruction value $IM_2$ which is set to change the motor torque to $T_{M2}$ is outputted (step 208) (the position (4) in FIG. 12).

When pressure on the accelerator is released and the degree the accelerator opens decreases, the motor torque $T_{M2}$ is decreased (the position (5) in FIG. 12) by the accelerator response control (step 209), and the driving torque $T_O$ decreases. At the same time, each threshold is determined by the threshold control (step 210) based upon the battery state of charge SOC.

In a stoichiometric state, the value of the degree the accelerator opens α detected from the accelerator sensor 13, is determined whether it is less than the threshold $b_2$ determined in the threshold control or not (step 211). When it is more than the threshold $b_2$, the vehicle speed is determined whether it is less than the threshold $c_2$, or not (step 212). When it is more than the threshold $c_2$, the accelerator response control and the threshold control are continued.

In the step 211 and the step 212, when the degree the accelerator opens is less than the threshold $b_2$, or the vehicle speed is less than the threshold $c_2$, as illustrated at the position (6) in FIG. 12, the air/fuel ratio supplied to the engine 2 is changed to be lean, and the degree that the throttle of the engine 2 is opened is determined so that the engine 2 can output the most efficient engine torque $T_{E1}$ when the engine 2 drives in a lean state.

Based upon the determination of the step 213, the air/fuel ratio selection instructing signal and the throttle opening degree signal are outputted to the engine control device 11, with the efficiency characteristic of the engine 2 changed to be lean from a stoichiometric state, and the engine torque is changed from $T_{E2}$ to $T_{E1}$ (step 214) (the position (7) in FIG. 12).

Meanwhile, the motor torque $T_{M2}$, as has been already described, decreases at a speed corresponding to the decreasing speed of the degree the accelerator opens, and so the motor torque $T_{M3}$ is determined so that the decreasing speed of the driving torque $T_O$ does not vary as the engine torque $T_E$ decreases.

The value of the driving torque $T_O$ from which the engine torque $T_{E3}$ in a lean state is subtracted is determined as the amended motor torque $T_{M3}$ (step 215). Then the motor current instruction value $IM_3$ which is set to change the motor torque to $T_{M3}$ is outputted (step 216). On the time chart, the decreasing speed of the motor torque $T_M$ changes to that of a slowly decreasing speed (the position (8) in FIG. 12).

As described in the above, the degree the accelerator opens and the vehicle speed which are both detected as the second required running load have hysteresis and different thresholds, $b_1$, $b_2$ ($b_1 > b_2$), and $c_1$, $c_2$ ($c_1 > c_2$) which are set respectively, when they increase and decrease, and hunting is prevented.

By the above-described control operation, when the battery state of charge SOC is small, the stoichiometric region becomes large so that the battery state of charge SOC increases to quickly return to the original state, and when the battery state of charge SOC is sufficient, the lean region becomes large and the engine is controlled to mainly drive in the lean region with less fuel consumption. By this control operation, the energy efficiency of the entire body of the hybrid vehicle is further improved. It is added that the case in which the above-described control is not conducted is illustrated by a broken line.

Though the first and second embodiment described above have two kinds of efficiency characteristics of the engine, lean and stoichiometric, control may be done to select the most efficient efficiency characteristic according to the required running load, with a number of kinds of air/fuel ratios of the mixed gas supplied to the engine provided, and further, the air/fuel ratio may be controlled to successively change in accordance with the change of the required running load. In this case, the engine is driven far more efficiently.

There are a momentary required running load and a stored required running load in the detected required running loads. The momentary required running load is the amount which can be detected as a required running load at a given time, and, for example, the vehicle speed (km/h), the degree the accelerator opens (%), the output value of the generator/motor 3 when driving as a motor(kw), the battery output value (kw, I, V) can be cited. The stored required running load is the amount which can be detected as a stored amount of the running required load, and, for example, the accumulating value of the motor output (kwh), the accumulating value of the battery output (kwh, Ah) and so on are cited other than the battery state of charge.

The value detected as the first load in the above-described embodiment may be the integrated value of the motor output of the generator/motor when driving as a motor (kwh), the integrated value of the battery output (kwh, Ah) and so on, other than the battery state of charge. And the value detected as the second load may be the motor output value of the generator/motor when driving as a motor (kw), the output value of the charge means (kw, I, V), the accumulating value of the motor output (kwh), the accumulating value of the battery output (kwh, Ah) and so on, other than the degree the accelerator opens (%) and the vehicle speed (km/h).

The following is cited as the required running load detecting means for detecting these required running loads. The battery sensor is cited as a means for detecting the battery state of charge, the accelerator sensor is cited as a means for detecting the degree the accelerator opens, the vehicle speed sensor as a means for detecting the vehicle speed, the motor current sensor as a means for detecting the motor output, and the battery current-voltage sensor as a means for detecting the battery output.

As the engine 2 defined by a gasoline engine, a variable displacement engine which can partly stop the operation of the cylinders may be used other than the above-described lean burn engine. The cylinders are controlled so that, for example, when the required running load is low, the partial operation of the cylinders is stopped, and when the required running load is high, all the cylinders are operated.

Other than the above, a high expansion ratio engine having a variable valve mechanism (miller cycle engine) may be used. For example, by modifying the valve mechanism of the engine so that a number of ratios of the compression ratio and the expansion ratio can be set, the engine is controlled so as to drive with the most efficient engine torque in each ratio which is set. In concrete terms, when the required running load is low, the compression ratio is reduced compared to the expansion ratio, and when the required running load is high, the compression ratio is increased.

As for the generator/motor 3, an alternating current induction motor and an alternating current magnet motor can be used other than a direct current motor.

As for the electricity storage means, a capacitor, a fly wheel battery, an oil pressure (air pressure) accumulator and so on are cited other than the battery used in each of the above-described embodiments. A capacitor is a condenser of large capacity and the residual electricity capacity can be known by detecting the voltage of the capacitor. A fly wheelbattery is a battery which takes in and gives out electric power by driving and regenerating a fly wheel by a motor positioned on the same axle as the fly wheel, and the residual electricity capacity can be known by detecting the rotational frequency of the fly wheel. An oil pressure (air pressure) accumulator is a battery which takes in and gives out electric power by taking oil pressure (air pressure) in, and giving oil pressure out of an accumulator by an oil pressure (air pressure) pump connected to the accumulator, and the residual electricity capacity can be known by detecting the oil pressure (air pressure). As a kind of battery, a lead battery, a nickel-cadmium storage battery, a nickel-iron storage battery, a nickel-zinc storage battery, a lithium battery, and so on are cited.

Figure 16:
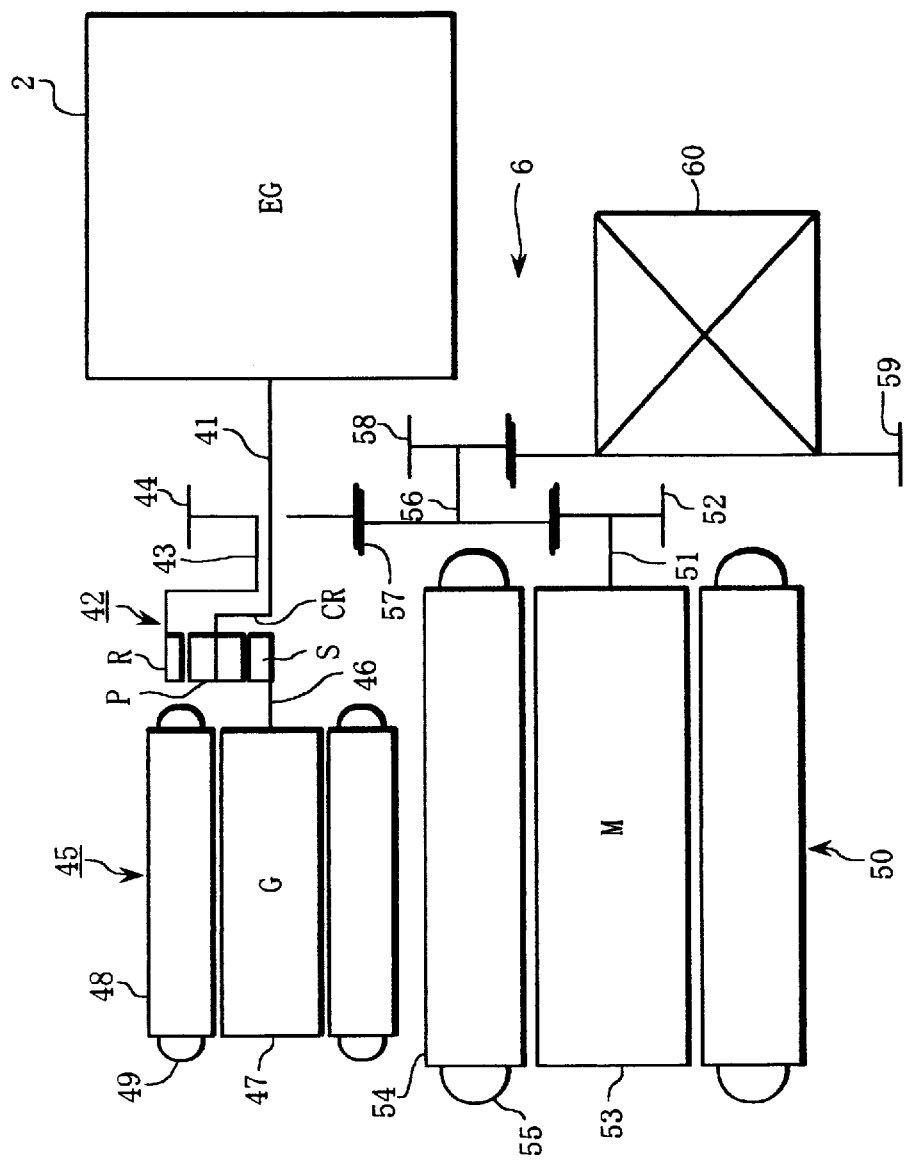
FIG. 16 is a conception diagram illustrating the arrangement of the driving system of the third embodiment.

Next, the embodiment having a different driving system from those of the above-described first and second embodiments will be described. FIG. 16 is a conception diagram illustrating the driving system of the hybrid vehicle in the third embodiment of the present invention.

In the drawing, 2 is an engine (EG), 41 is an output shaft which outputs the rotation generated by driving the above-described engine 2, 42 is a planetary gear unit as a differential gear device shifting the speed of the rotation input through the above-described output shaft 41, 43 is an output shaft by which the shifted rotation in the above-described planetary gear unit 42 is outputted, 44 is a first counter drive gear fixed at the above-described output shaft 43, and 45 is a generator (G) connected to the above-described planetary gear unit 42 through a transmission shaft 46. The above-described output shaft 43 has a sleeve forn, and is positioned so as to surround the above-described output shaft 41. The above-described first counter drive gear 44 is positioned closer to the engine 2 than the planetary gear unit 42.

The above-described planetary gear unit 42 consists of a sun gear S, a pinion gear P engaged in the sun gear S, a ring gear R engaged in the pinion gear, and a carrier CR supporting the above-described pinion P so as to be rotatable.

The above-described sun gear S is connected to a generator 45 through the above-described transmission shaft 46, the ring gear R is connected to the first counter drive gear 44 through the output shaft 43, and the carrier CR is connected to the engine 2 through the output shaft 41.

The above-described generator 45 consists of a rotor 47 which is fixed on the above-described transmission shaft 46 and is positioned so as to be rotatable, a stator 48 positioned around the rotor 47, and a coil 49 coiled around the stator 48. The above-described generator 45 generates electric power by the rotation transmitted through the transmission shaft 46. The above-described coil 49 is connected to the battery which is not illustrated in the drawing, and the electric current is supplied to the battery and stored therein. 50 is a motor (M) which receives the electric current from the above-described battery and generates rotation, 51 is an output shaft by which the rotation of the above-described motor 50 is outputted, 52 is a second counter drive gear fixed at the above-described output shaft 51. The above-described motor 50 consists of a rotor 53 which is fixed to the above-described output shaft 51 and positioned so as to be rotatable, a stator 54 positioned around the rotor 53, and a coil 55 coiled around the stator 54. The above5 described motor 50 generates torque by the electric current supplied to the coil 55.

Accordingly the above-described coil 55 is connected to a battery which is not illustrated in the drawing and electric current is supplied from the battery.

A counter shaft 56 is provided in order to rotate the driving wheels, which are not illustrated in the drawing, in the same direction as the rotation of the above-described engine 2, and a counter driven gear 57 is fixed to the counter shaft 56. With the counter driven gear 57 engaged in the above-described first counter drive gear 44, and with the counter driven gear 57 engaged in the second counter drive gear 52, the rotation of the above-described counter drive gear 44 and the rotation of the second counter drive gear 52 are reversibly rotated and transmitted to the counter driven gear 57.

A dif-pinion gear 58, with the number of gear teeth smaller than that of the above-described counter driven gear 57, is fixed to the above-described counter shaft 56.

A dif-ring gear 59 is positioned on the axis line parallel to the above-described counter shaft 56, and the dif-ring gear 59 and the above-described dif-pinion gear 58 are engaged. A differential device 60 is fixed to the above-described dif-ring gear 59, and the rotation transmitted to the dif-ring gear 59 is differentially rotated by the above-described differential device 60 and transmitted to the driving wheels. In the above-described arrangement, the driving output system 6 is defined by the counter shaft 56, the counter driven gear 57, the dif-pinion gear 58, the dif-ring gear 59, and the differential device 60.

Since not only the rotation generated by the engine 2 but also the rotation generated by the motor 50 can be transmitted to the counter driven gear 57 as described above, a hybrid vehicle can run in an engine driving mode in which only the engine 2 drives, in a motor driving mode in which only the motor 50 drives, and in an engine and motor driving mode in which the engine 2 and the motor 50 drive. The engine 2 can also be started by the generator 45.

In a driving system like this, when the control is made by the control system 9 illustrated in FIG. 1, the motor torque of the motor (M) 50 and the engine (EG) 2 are controlled. The torque which varies when the efficiency characteristic of the engine 2 changes is amended by adjusting the motor torque of the motor 50.

Figure 17:
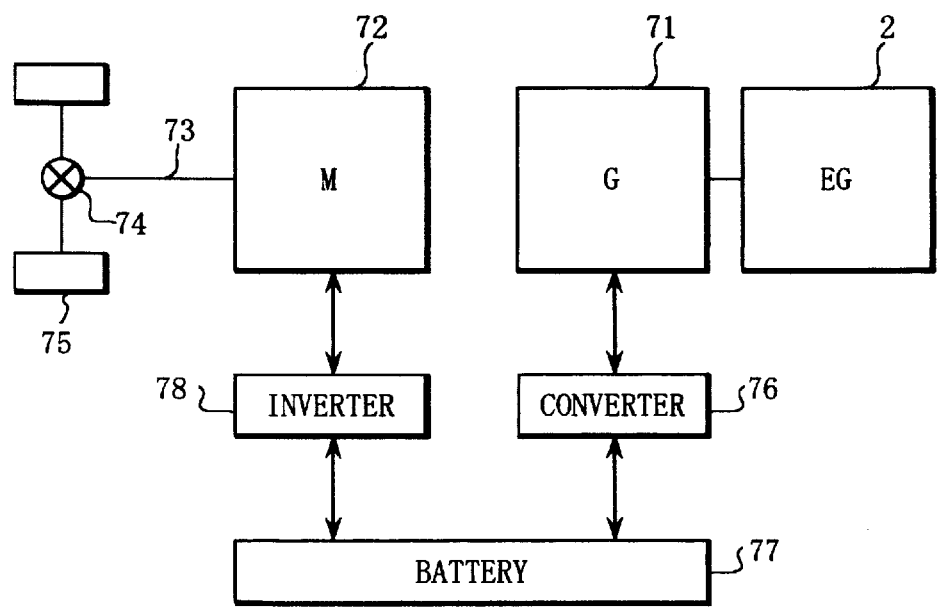
FIG. 17 is a conception diagram illustrating the arrangement of the driving system of a series type of hybrid vehicle.

Next, the driving system of the hybrid vehicle of the fourth embodiment will be described. FIG. 17 is a conception diagram illustrating the driving system of a series type of hybrid vehicle of the present embodiment. This driving system includes an engine 2, a generator 71 generating electricity by the driving power of the engine 2, and a motor 72, and an output shaft 73 of the motor 72 is connected to a differential device 74. Only the driving power of the motor 72 is transmitted to a pair of driving wheels 75 through the differential device 74.

The electric power generated by the generator 71 is stored in a battery 77 through a converter 76. The electric power stored in the battery 77 is supplied through an inverter 78 as the driving electric power of the motor 72.

In the embodiment of the above-described arrangement, in which the engine torque is not transmitted to the driving wheels, it is not necessary to consider the torque variances of the driving output system which occurs when the efficiency characteristic of the engine is changed. Accordingly, as for the control of the motor 3, only the accelerator response control for obtaining the driving torque according to the degree the accelerator opens is conducted, and the control which amends the engine torque variance is not conducted. The description of the other control operations is abbreviated since they are the same as those described in the first embodiment.

By these controls, the most efficient efficiency characteristic can be selected according to a required running load, and the engine is always kept driving in the most efficient state, whatever required running load the engine has.

The hybrid vehicle of the present invention described above is not limited to the above-described arrangement, and it is applicable to other arrangements, for example, a series and parallel type of hybrid vehicle and so on. As an arrangement of a series and parallel type of hybrid vehicle, for example, the vehicle which becomes a series type of hybrid vehicle by disconnecting a clutch between a generator and a transmission and becomes a parallel type of hybrid vehicle by connecting the clutch is cited.

As described above, by utilizing the hybrid vehicles of the present invention, in which the most efficient efficiency characteristic can be selected according to the detected required running load fluctuation, the engine can always maintain the most efficient driving state.

In the case of a parallel type of hybrid vehicle, the engine torque variance occurs when the efficiency characteristic of the engine changes is amended by the motor torque, so that a good smooth feeling is maintained while running.

When the generator/motor is used as a motor, surplus torque can be generated, for example, while the vehicle is stopped, or when the driving torque is fully supplied by the engine torque, and this regenerative electric power can be stored in the electricity storage means. Accordingly, the consumption of the state of charge of the electricity storage means can be curbed.

In an arrangement in which electricity is generated in a part of the engine torque by separately providing a generator, the generator can be always operated, so that the state of charge of the electricity storage means can be stabilized.

In the case of a series type of hybrid vehicle, the state of charge of the electricity storage means can soon be recovered quickly while always maintaining the most efficient driving condition in each efficiency characteristic by changing the efficiency characteristic according to required running loads.

What is claimed is:

1. A hybrid vehicle, comprising:
   a combustion engine;

an electric motor;

an electricity storage means, electrically connected to said electric motor, for supplying electricity to said electric motor;

an output shaft connected to said engine and to said electric motor for receiving engine torque and motor torque, and for outputting the total of the engine torque and the motor torque as an output torque;

required running load detecting means for detecting a required running load;

engine controlling means for controlling said engine to operate in accordance with one of plural, mutually exclusive and predetermined engine-speed-torque relationships, in accordance with an instruction signal;

vehicle control means for selecting said one relationship from among said plural, mutually exclusive and predetermined relationships, based on the detected required running load, and for outputting said instruction signal, indicative of the selection, to said engine controlling means; and motor controlling means for compensating for a variance in the output torque which occurs as the engine speed-torque relationship is changed by said engine controlling means by controlling the motor torque output by said electric motor.

2. The hybrid vehicle according to claim 1, wherein said electricity storage means stores at least part of the output from the engine as regenerative energy from the electric motor.

3. The hybrid vehicle according to claim 1, further comprising a clutch positioned between said engine and said output shaft.

4. The hybrid vehicle according to claim 1, wherein the load detected by said required running load detecting means is at least one of the state of charge of the electricity storage means, the vehicle speed, the degree of accelerator openning, a motor output value, and an electricity storage means output value.

5. The hybrid vehicle according to claim 1, wherein said required running load detecting means detects the state of charge of said electricity storage means as first load, and detects at least one of vehicle speed, the degree of accelerator opening, motor output, electricity storage means output, an accumulated value for motor output, and an accumulated value for said electricity storage means as second load, and wherein said engine controlling means changes the engine speed-torque relationship for said combustion engine when the detected value of said second load is over a threshold value and changes said threshold value based upon the detected value of said first load.

6. The hybrid vehicle according to claim 1, wherein said engine controlling means changes the engine speed-torque relationship by changing an air-fuel ratio of a mixed gas consisting of fuel and air supplied to said internal-combustion engine.

7. The hybrid vehicle according to claim 1, further comprising a generator for converting a part of the engine torque into electricity which is stored in said electricity storage means.

8. The hybird vehicle according to claim 6, wherein said engine speed-torque relationships correspond, respectively, to plural, mutually exclusive ranges for the air-fuel ratio.

9. The hybrid vehicle according to claim 6 wherein said engine speed-torque relationships are two in number and correspond, respectively, to two mutually exclusive and predetermined ranges for the air-fuel ratio.

10. The hybrid vehicle according to claim 6, wherein the air-fuel ratio is increased by decreasing said fuel in accordance with an increase in the amount of the state of charge of said electricity storage means.

11. The hybrid vehicle according to claim 1, wherein said internal-combustion engine is a variable displacement engine.

12. The hybrid vehicle according to claim 5, wherein said threshold value is increased in accordance with an increase in the detected value of said first load.

13. The hybrid vehicle according to claim 7, further comprising a differential gear unit including a first element connected to said engine, a second element connected to said generator, and a third element connected to said electric motor and to said output shaft.

14. The hybrid vehicle according to claim 8, wherein said ranges for the air-fuel ratio include a first range defining a stoichiometric ratio of air to fuel and a second range defining an air to fuel ratio leaner than the air to fuel ratio of said stoichiometric range.

15. The hybrid vehicle according to claim 9 wherein said two ranges for the air-fuel ratio are a first range for a stoichiometric ratio of air to fuel and a second range for an air to fuel ratio leaner than said first range.

16. A hybrid vehicle, comprising:

a combustion engine wherein the compression ratio and the expansion ratio can be changed;

an electric motor;

an electricity storage means, electrically connected to said electric motor, for supplying electricity to said electric motor;

an output shaft connected to said engine and to said electric motor for receiving engine torque and motor torque, and for outputting the total of the engine torque and motor torque as output torque;

required running load detecting means for detecting a required running load;

engine controlling means for changing the compression ratio and the expansion ratio of said engine, in accordance with an instruction signal;

vehicle control means for selecting the compression ratio and the expansion ratio, based on the detected required running load, and for outputting said instruction signal, indicative of the selection, to said engine controlling means; and motor controlling means for compensating for a variance in the output torque, which occurs as the compression ratio and the expansion ratio are changed by said engine controlling means, by controlling the motor torque output by said electric motor.

* * * * *

UNITED STATES PATENT AND TRADEMARK OFFICE
CERTIFICATE OF CORRECTION

PATENT NO.    : 5,806,617
DATED         : September 15, 1998
INVENTOR(S)   : Kozo Yamaguchi It is certified that error appears in the above-identified patent and that said Letters Patent is hereby corrected as shown below:

<u>Title page,</u>
Columns 1-18, should be deleted and substitute therefor the attached title page showing item [57], ABSTRACT and columns 1-16, as corrected.

Signed and Sealed this

Thirtieth Day of October, 2001

Attest:

NICHOLAS P. GODICI
Attesting Officer      Acting Director of the United States Patent and Trademark Office

United States Patent
Yamaguchi

Patent Number: 5,806,617
Date of Patent: Sep. 15, 1998

[54] HYBRID VEHICLE

[75] Inventor: Kozo Yamaguchi, Aichi-ken, Japan

[73] Assignee: Kabushikikaishi Equos Research, Japan

[21] Appl. No.: 08/634,303

[22] Filed: Apr. 16, 1996

[30] Foreign Application Priority Data

Apr. 20, 1995 [JP] Japan .................. H7-119372

[51] Int. Cl.$^6$ .................. B60K 1/00
[52] U.S. Cl. .................. 180/65.2; 180/65.4; 180/65.3; 475/5
[58] Field of Search .................. 180/65.2, 65.4, 180/65.3, 65.6, 65.7; 475/5, 1; 74/661

[56] References Cited

U.S. PATENT DOCUMENTS

| | | | |
|---|---|---|---|
| 3,566,717 | 3/1971 | Berman et al. | 180/65.2 |
| 3,650,345 | 3/1972 | Yardney | 180/65.2 |
| 4,042,056 | 8/1977 | Horwinski | 180/65.2 |
| 4,351,405 | 9/1982 | Fields et al. | 180/65.2 |
| 4,753,078 | 6/1988 | Gardner, Jr. | 60/668 |
| 5,115,183 | 5/1992 | Kyoukane et al. | 320/61 |
| 5,343,970 | 9/1994 | Severinsky | 180/65.2 |
| 5,427,196 | 6/1995 | Yamaguchi et al. | 180/65.2 |
| 5,495,912 | 3/1996 | Gray, Jr. et al. | 180/165 |
| 5,513,719 | 5/1996 | Moroto et al. | 180/65.4 |
| 5,558,588 | 9/1996 | Schmidt | 475/5 |
| 5,577,973 | 11/1996 | Schmidt | 475/5 |
| 5,588,498 | 12/1996 | Kitada | 180/65.4 |
| 5,643,119 | 7/1997 | Yamaguchi et al. | 475/5 |
| 5,667,029 | 9/1997 | Urban et al. | 180/65.2 |
| 5,697,466 | 12/1997 | Moroto et al. | 180/65.2 |
| 5,720,690 | 2/1998 | Hara et al. | 477/20 |
| 5,722,502 | 3/1998 | Kubo | 180/65.4 |

Primary Examiner—Richard M. Camby
Assistant Examiner—Bridget Avery
Attorney, Agent, or Firm—Lorusso & Loud

[57] ABSTRACT

A hybrid vehicle in which an engine can be continuously driven in a highly efficient region in accordance with the required running load. An engine torque of a combustion engine (2), in which an efficiency characteristic can be selected as either a lean state or a stoichiometric state, and a motor torque of a generator/motor (3) are transmitted to a drive output system as a driving torque. The combustion engine (2) is continuously operated in the most efficient state for each selected efficiency characteristic which, and a vehicle controller (10) adjusts the motor torque by controlling the generator/motor (3) in accordance with the degree of accelerator opening, selects an efficiency characteristic in accordance with the required running load as detected by a running load detector, and compensates for change in engine torque, which accompanies a change in the efficiency characteristic, by changing the motor torque.

16 Claims, 15 Drawing Sheets

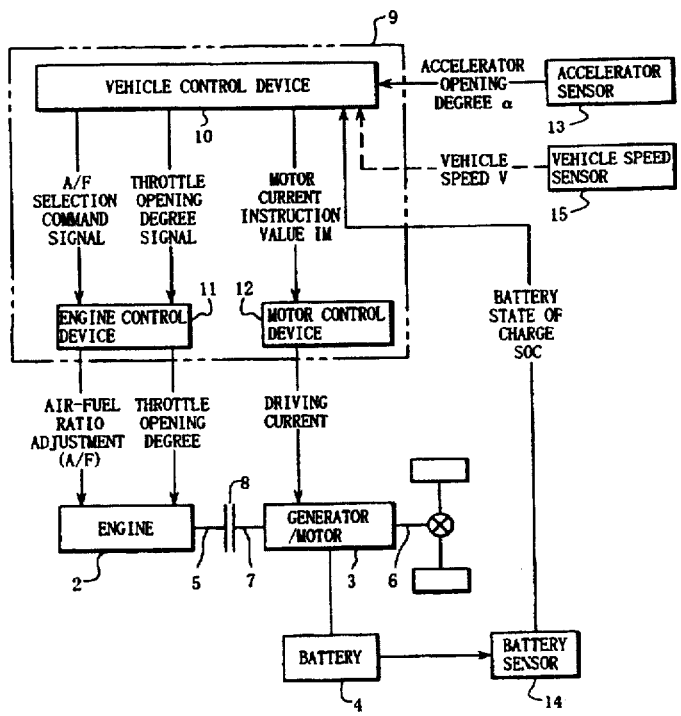

HYBRID VEHICLE

BACKGROUND OF THE INVENTION

1. Field of the Invention

The present invention relates to a hybrid vehicle and more particularly to a hybrid vehicle which has an engine which drives with high efficiency.

2. Description of Related Art

Conventionally, a hybrid vehicle has, as power sources, an engine and a motor.

Various types of hybrid vehicle have been provided, and these vehicles are classified as either a series (direct) type of hybrid vehicle in which electric energy is generated by a generator driven by the engine and supplied to the motor which, in turn drives the wheels, or a parallel type of hybrid vehicle in which the wheels are directly driven both by the engine and by the motor.

In the series type of hybrid vehicle, the engine is operated at a fixed point in a highly efficient region. In the parallel type of hybrid vehicle, when the required running load is heavy, motor torque supplements engine torque, and when the required running load is light, part of the engine torque is used as driving torque for the motor to regenerate electricity and the engine is continuously operated in the region of high efficiency.

When the engine is continuously operated in the region of high efficiency, the following disadvantages occur.

An engine with a large capacity is efficient when the required running load is heavy, whereas an engine with a small capacity is more efficient when the required running load is light.

In other words, with an engine having a large capacity selected for high speed driving in which the load is heavy and for driving on an upward slope, the high efficiency region can't be attained when running on city streets on which the vehicle runs most frequently, and therefore, the fuel consumption increases.

In an engine with a small capacity selected for running on city streets, the high efficiency region can't be attained when running at a high speed or on an upward slope on which the load is heavy. In this case, the engine can be designed for sacrificing a reduction in the fuel consumption, and the engine must be kept rotating at an extremely high speed, with the result that it becomes noisy and the life of the engine becomes short.

In a parallel type of hybrid vehicle, in which the output of the engine is directly transmitted to the driving wheels, the above-described disadvantages directly occur.

These disadvantages also occur in the series type of hybrid vehicle. In the case of the series type of hybrid vehicle, when the required running load becomes large, the output of the motor needs to be increased, and in order to do this, the electric power supplied to the motor has to be increased. The need for more power, in turn, requires that the output of the engine which drives the generator be increased. Accordingly, even in the case of the series type of hybrid vehicle, it is difficult to always run the engine in the high efficiency region.

An object of the present invention is to provide a hybrid vehicle in which the engine can always be driven in the most efficient driving state.

SUMMARY OF THE INVENTION

The hybrid vehicle of the present invention includes a combustion engine operable in accordance with one of plural engine speed-torque characteristics selected by a command signal, an electric motor, an electricity storage means electrically connected to the electric motor, an output shaft connected to the engine and the electric motor, required running load detecting means for detecting a required running load, engine controlling means for changing the engine speed-torque characteristic in accordance with the value detected by the required running load detecting means, and motor controlling means for compensating for a change in output torque which occurs as the engine speed-torque characteristic is changed by the engine controlling means.

The electricity storage means supplies the electric motor with electric power and stores part of or all the engine output as regenerative energy from the electric motor.

A clutch may be positioned between the engine and output shaft.

The load detected by the required running load detecting means is at least one of the following: the state of charge of the electricity storage means, vehicle speed, the degree of accelerator opening, a motor output value, and an electricity storage means output value.

In a preferred embodiment, the required running load detecting means detects the state of charge of the electricity storage means as a first load, and detects, as a second load, at least one of the following: the vehicle speed, the degree of accelerator opening, motor output, electricity storage means output, a motor output accumulated value, and an electricity storage means accumulated value. The engine controlling means changes the engine speed-torque characteristic of the combustion engine when the detected value of the second load is over a threshold amount and changes the threshold amount based upon the detected first load value.

The engine controlling means may change the engine speed-torque characteristic by changing the air/fuel ratio of the mixed gas consisting of fuel and air supplied to the internal combustion engine. The air/fuel ratio may be increased by decreasing the fuel in accordance with an increase in the amount of charge of the electricity storage means. Alternatively, the air/fuel ratio may be changed in accordance with the value detected by the required running load detecting means.

The aforementioned threshold amount may be changed to be a higher value in accordance with an increase in the detected value of the first load.

The internal-combustion engine may be a variable displacement engine and may have a variable valve mechanism.

The hybrid vehicle may also have a generator to which a part of the engine output energy is transmitted, whereby energy thus generated is stored in the electricity storage means.

The hybrid vehicle may also include a differential gear unit having a first element connected to the engine, a second element connected to the generator, and a third element connected both to the electric motor and to the output shaft.

In the hybrid vehicle of the invention, the combustion engine has plural engine speed-torque characteristics, one of which is selected responsive to a command signal and the electricity storage means is electrically connected to the electric motor. The output shaft is connected both to the engine and to the electric motor. The required running load is detected by the required running load detecting means. The engine controlling means changes the engine speed-torque characteristic in accordance with a value detected by the required running load detecting means. The motor controlling means compensates for a change in output torque which occurs when the engine speed-torque characteristic is changed by the engine controlling means.

BRIEF DESCRIPTION OF THE DRAWINGS

Figure 6:
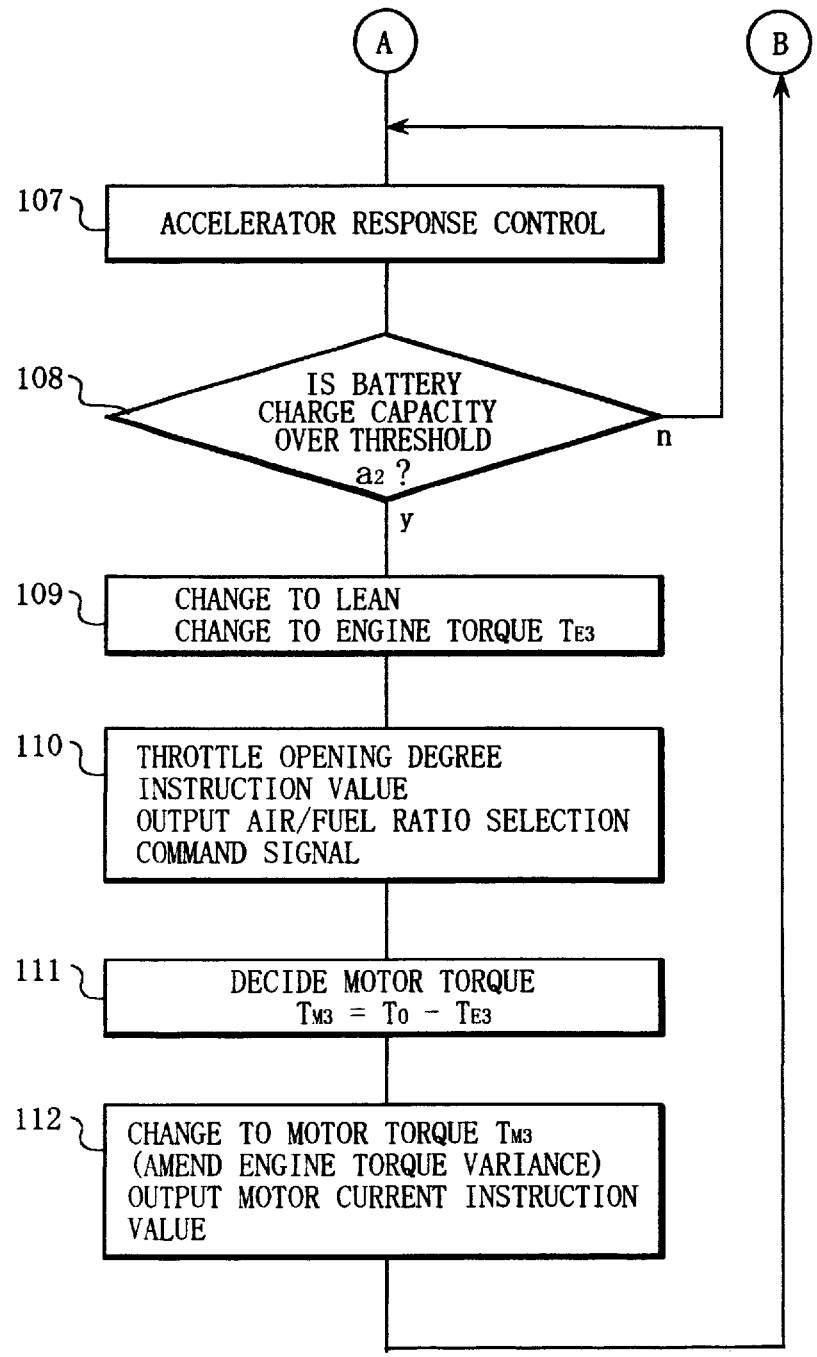
FIG. 6 is a flow chart illustrating the control operation of the control system.
Figure 7:
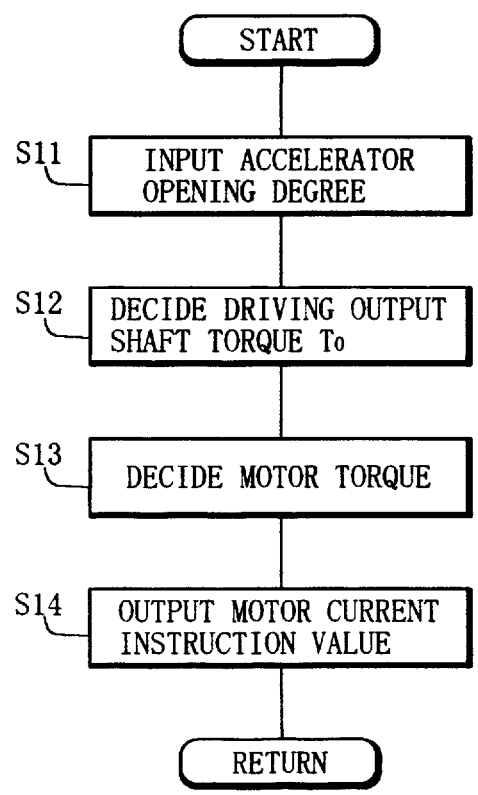
FIG. 7 is a flow chart illustrating the control operation of the acceleration response control which is a subroutine.
Figure 14:
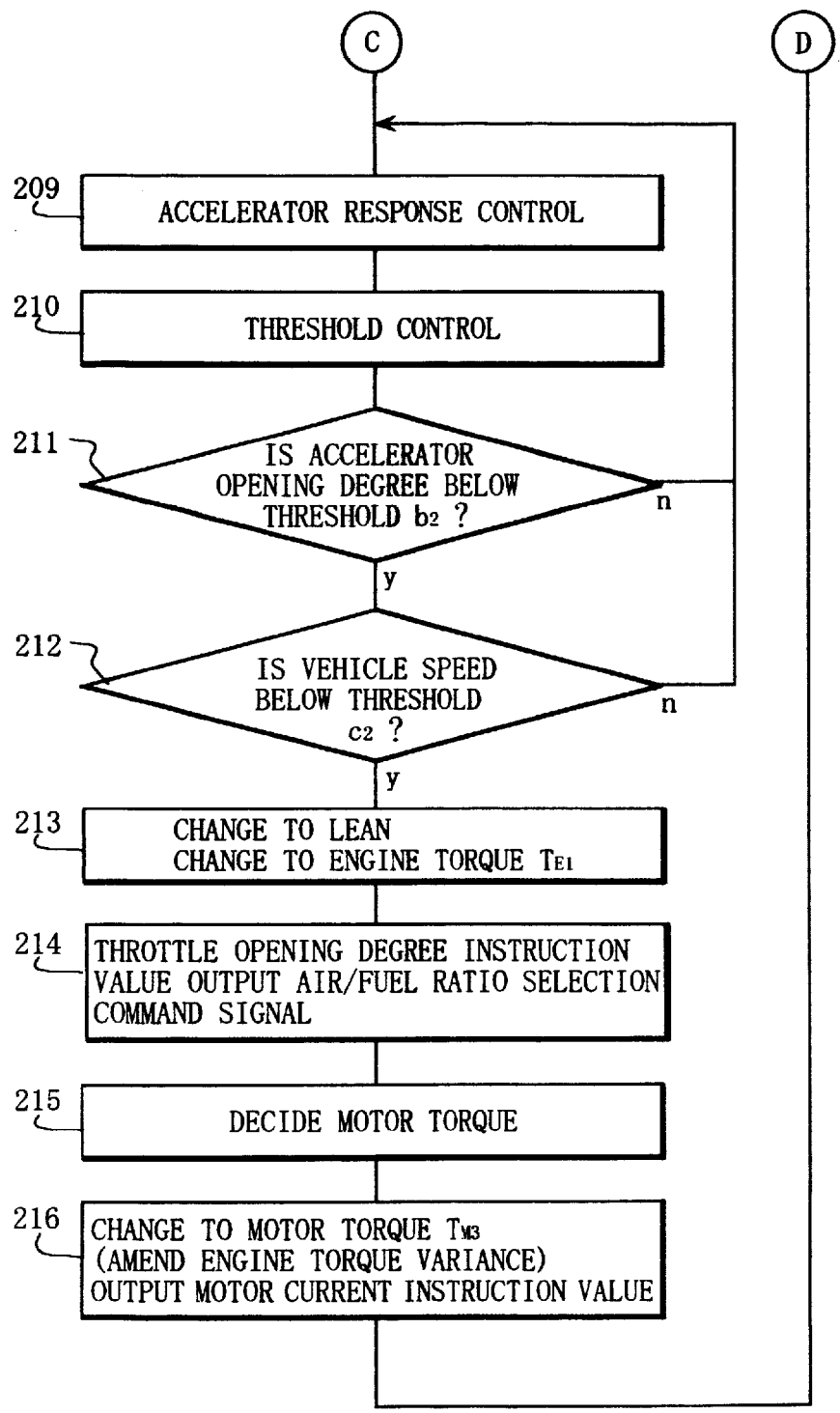
FIG. 14 is a flow chart illustrating the continuing control operation of the control system.
Figure 15:
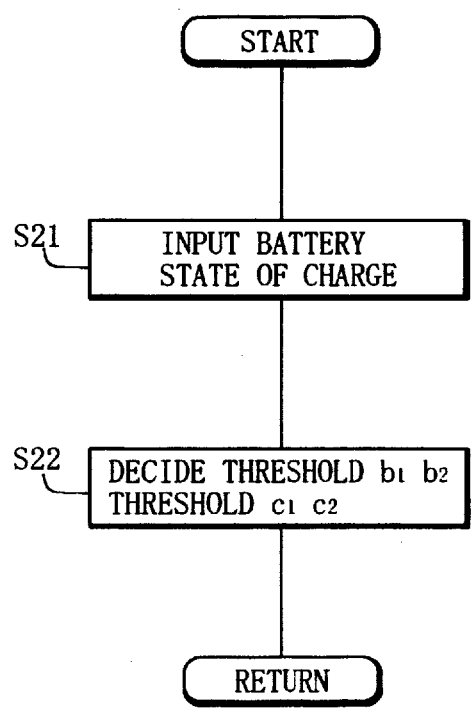
FIG. 15 is a flow chart illustrating the control operation of the threshold control which is a subroutine.

FIG. 1 is a block diagram of the control system of the hybrid vehicle;

FIG. 2 is a graph showing the relationship among the air/fuel ratio, the engine torque, the torque variance and NOx;

FIG. 3 is a graph showing the maximum efficiency of the engine;

FIG. 4 is a time chart illustrating the control operation of the control system;

FIG. 5 is a flow chart of the control operation of the control system;

FIG. 6 is a continuation of the flow chart of FIG. 5;

FIG. 7 is a flow chart of the accelerator response control subroutine executed as step 107 in the routine of FIGS. 5 and 6;

FIG. 8 is a schematic diagram of an embodiment of the drive train of the hybrid vehicle of the present invention;

FIG. 9 is a graph of the relationship between the battery state of charge SOC and the threshold $b_1$ ($b_2$) of the degree of accelerator opening;

FIG. 10 is a graph of the relationship between the battery state of charge SOC and the threshold $c_1$ ($c_2$) of the vehicle speed V;

FIG. 11 is a graph of the thresholds of the degree of accelerator opening and the vehicle speed when the battery state of charge SOC has a certain value;

FIG. 12 is a time chart for the control operation in the second embodiment;

FIG. 13 is a flow chart of another embodiment of control operation of the control system;

FIG. 14 is a continuation of the flow chart of FIG. 13;

FIG. 15 is a flow chart of the subroutine for threshold control executed as step 210 in the routine of FIGS. 13 and 14;

FIG. 16 is a schematic diagram of a third embodiment of the present invention; and FIG. 17 is a block diagram of a series type of hybrid vehicle.

DETAILED DESCRIPTION OF THE PREFERRED EMBODIMENT(S)

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Preferred embodiments will now be described with reference to the accompanying drawings.

FIG. 1 depicts a first embodiment of the present invention, and is a block diagram of a control system of a hybrid vehicle 1. The hybrid vehicle 1 includes an engine 2 which may be either an internal-combustion engine or an external-combustion engine, a generator/motor 3 which generates electricity from engine torque generated by the engine 2 and which generates motor torque from supplied electric power, a battery 4 as a electricity storage means for supplying the generator/motor 3 with electric power, an engine output shaft 5, a drive output system 6 for ultimately transmitting a driving torque to driving wheels, and a clutch 8 provided between an output shaft 7 of the generator/ motor 3 and the output shaft 5 of the engine 2. A control system 9 controls the operations of the engine 2 and the generator/motor 3.

The efficiency characteristic of engine 2 can be changed in such a way that the efficiency is maximized both when the output is high and when the output is low. In the present embodiment a lean burn engine has one of a number of efficiency characteristics established by changing its air-fuel ratio. In the vehicle of this embodiment, the air-fuel ratio of the mixed gas (the mixed gas consists of fuel and air) which is burned is changed between two states, that is, between a theoretical air-fuel ratio state (hereinafter called "stoichiometric") and a lean mixed gas state (hereinafter called "lean"), and each state has a different efficiency characteristic. The state of the engine driven with a stoichiometric air-fuel ratio is hereinafter referred to as a "stoichiometric state", and the state of the engine driven with a lean air-fuel ratio is referred to as a "lean state".

As FIG. 2 depicts, the air-fuel ratio of the mixed gas which is in a lean state is set within, for example, the range (A) of 22 to 23 which is just before the engine torque variance exceeds the allowable value. This range is hereinafter defined as a lean region, and in the same way, in FIG. 2, the region in which the air-fuel ratio is near the theoretical (stoichiometric) air-fuel ratio is defined as a stoichiometric region.

FIG. 3 is a graph illustrating the general idea of operation of the engine 2 in one of two different ranges of air/fuel ratio. The output of engine 2 is controlled so that the engine torque and engine speed are within the range (B) when the output is high and the engine torque and engine speed are within the range (C) when the output is low.

The generator/motor 3 generates a motor torque when supplied with electric current from the battery 4, and generates a regenerative current when driven by the output shaft 7. The motor torque is controlled by, for example, changing the amount of the current supplied to generator/motor 3.

The clutch 8 selectively connects the output shaft 7 of the generator/motor 3 and the output shaft 5 of the engine 2. When an engine torque is output and the generator/motor 3 outputs a motor torque, the total torque, which is the total of the engine torque and the motor torque, is output to the drive output system 6. In the state in which the clutch 8 is connected, when the generator/motor 3 acts as a generator, part of the engine torque is input to the output shaft 7 whereby the generator/motor 3 generates a regenerative current. In the state in which the clutch 8 is released, only the motor torque is transmitted to the drive output system 6.

Next, the control system 9 will be described. The control system 9 includes a vehicle controller 10, an engine controller 11 and a motor controller 12, all of which are control means.

Each controller 10, 11, and 12 is a micro computer including, for example, a CPU (Central Processing Unit), a ROM (Read Only Memory) in which each kind of program and data is loaded, a RAM (Random Access Memory) used as a working memory, and so on.

The vehicle controller 10 controls the drive output ultimately transmitted to the drive output system 6. The torque is controlled so that the drive torque ultimately transmitted to the drive output system 6 is determined based upon the degree of accelerator opening which is detected by an accelerator sensor 13 and the determined torque is transmitted to the drive output system 6 by increasing the instruction value of the motor current IM.

When the engine controller 11 receives a throttle opening degree signal input from the vehicle controller 10, the engine controller 11 adjusts the degree of throttle opening in accordance with the signal, and thereby controls the engine output. When the engine controller 11 receives an air/fuel ratio (A/F) selection instruction signal, it selects either the lean air/fuel ratio range or the stoichiometric air/fuel ratio range, and thereby sets the efficiency characteristic.

The motor controller 12, when receiving the instruction value of the motor current IM inputted from the vehicle controller 10, adjusts the driving current supplied from the battery 4 and controls the motor torque of the generator/motor 3. When the motor controller 12 receives the regenerative current instruction value input from the vehicle controller 10, the regenerative current flows from the generator/motor 3 to the battery 4.

Meanwhile, when the detected value of the required running load input from a required running load detecting means reaches a specified threshold, the vehicle controller 10 selects the most suitable engine efficiency characteristic for the detected required running load. Further, the vehicle controller 10 determines the most efficient engine torque within the selected efficiency characteristic, and determines the motor torque so as to adjust for the engine torque variance which is generated when the efficiency characteristic is changed.

The vehicle controller 10 outputs an air/fuel ratio selection instruction signal, instructing the air/fuel ratio which achieves the selected efficiency characteristic, and the throttle opening degree signal, instructing the degree of the throttle opening corresponding to the determined engine torque, to the engine controller 11. That is, the efficiency characteristic of the engine 2 is changed responsive to the above-described air/fuel ratio selection instruction signal through the engine controller 11.

Further, the vehicle controller 10 outputs an instruction value for the motor current IM, corresponding to the determined motor torque, to the motor controller 12.

In the control routine, for example when the engine torque is reduced as a result of a change in the efficiency characteristic, the instruction value of the motor current IM is increased in order to compensate for the reduced output, and when the engine torque is increased as a result of a change in the efficiency characteristic, the motor current instruction value IM is reduced in order to adjust for that increased output. When more output than required can be obtained as the engine torque alone, as a result of a change in the efficiency characteristic, the regenerative current instruction value is output so that the regenerative current is generated by driving the generator/motor 3 using the surplus engine torque.

In this way, the engine 2 is always driven in the most effective region for each efficiency characteristic, and the torque ultimately transmitted to the drive output system 6 does not vary.

As FIG. 2 depicts, in the case of the present invention, in ordinary driving the engine 2 is driven in a lean state in which the NOX exhaust amount is small and the fuel consumption is less, and when driven at a high speed or on an upward slope with a heavy load, the engine 2 is controlled so as to operate in a stoichiometric state in which the engine torque is large. In a stoichiometric state, though the amount of NOX in the exhaust from the engine increases, it is contacted with a ternary catalyst to reduce the NOX to a low level. The engine 2 maintains the state with the highest driving efficiency and a fixed torque is continuously output in each state.

The operations of the vehicle controller 10 of the above-described driving system will be more specifically described with reference to the time chart of FIG. 4 and the flow charts of FIG. 5 to FIG. 7.

The position (0) in the time chart of FIG. 4 represents the state in which a vehicle is running at a low speed on an ordinary road. With the degree of accelerator opening a being small and the air/fuel ratio (A/F) of the mixed gas being lean, the engine 2 is driven to produce the most efficient torque in a lean state. The engine torque output in this lean state fully supplies the driving torque which is required of the driving output system, and surplus engine torque which drives the generator/motor 3 to produce regenerative current which flows from the generator/motor 3 to the battery 4.

In ordinary driving like this, the accelerator response is controlled in step 101 in FIG. 5, as illustrated in FIG. 7. When the degree of accelerator opening a, is input from the accelerator sensor 13 (step S11), the driving torque TO ultimately output to the driving output system is decided in order to provide driving power, in accordance with the degree of accelerator opening α, to the driving wheels (step S12). Accordingly, the driving torque TO changes in accordance with the change of the value of the degree of accelerator opening α.

In order to change the value of the motor torque TM following the change of the driving torque TO, the motor torque TM is determined by subtracting the engine torque TE from the driving torque TO (step S13). Then, in order to change the motor torque TMO to the motor torque TM, a corresponding instruction value for the motor current IM is output (step S14).

The accelerator response control steps (steps S11 to S14) are always conducted successively while running. As the position (1) in FIG. 4 represents, when the accelerator pedal is stepped on and the degree of accelerator opening a increases to change from α1 to α2, the instruction value of the motor current increases in accordance with the changing amount to change from IM0 to IM1. In this way, a driving torque in accordance with the degree of accelerator opening can be obtained.

In the present embodiment, the required running load detected is the battery state of charge SOC. A determination is made as to whether or not the value detected by the battery sensor 14, which serves as a required running load detecting means, is less than the threshold a1 (60%) (step 102). When it is more than 60%, the accelerator response control is continued. When the required running load increases as the driving torque TO increases as described above, the battery state of charge SOC decreases.

Position (2) in FIG. 4 represents the point when the battery state of charge SOC becomes less than 60%, at which point the air/fuel ratio supplied to the engine 2 is changed to the stoichiometric range (the position (3) in FIG. 4), and the degree of engine throttle opening is determined as that which provides the most efficient engine torque TE2 output with the engine 2 run in the stoichiometric state (step 103). The air/fuel ratio selection instruction signal and the throttle opening degree signal are output to the engine controller 11 based upon the determination of the step 103, with the efficiency characteristic of the engine 2 changed from lean to stoichiometric, and engine torque thereby changed from TE1 to TE2 (step 104).

Meanwhile, the value of the motor torque TM1 is decreased so that the driving torque TO does not increase when the engine torque increases, that is, so that the driving torque TO, determined in accordance with the degree of accelerator opening, does not vary by changing the efficiency characteristic of the engine.

That is to say, the value of the driving torque TO from which the stoichiometric state engine torque TE2 is subtracted is determined as the amended motor torque TM2 (step 105). The motor current instruction value IM2 for changing the motor torque to TM2, is output (step 106) (point (4) in FIG. 4). For amending the motor torque TM1, the method in which the amount of variance ΔTE of the engine torque TE1 is subtracted from the motor torque TM1 (TM2=TM1−ΔTE) may be used.

When the degree of accelerator opening decreases from α2 to α1, the motor torque TM2 decreases and the driving torque TO is decreased by using the accelerator response control (step 107). At this time, the vehicle controller 10 reduces the motor instruction value from IM2 to IM3 and controls the motor torque TM2 (point (5) in FIG. 4).

When the motor torque TM2 decreases, electricity is discharged from the generator/motor 3 to the battery 4, and the battery state of charge SOC increases.

Meanwhile, in a stoichiometric state, it is determined whether or not the battery state of charge SOC is more than the threshold a2 (70%) (step 108). When it is less than 70%, the accelerator response control (step 107) is repeated. As the position (6) in FIG. 4 illustrates, when the battery state of charge SOC becomes more than 70%, the air-fuel ratio supplied to the engine 2 is changed to be lean, and the degree of engine throttle opening is determined so that the most efficient engine torque TEI is output when the engine 2 is operated in a lean state (step 109). Based upon the determination of the step 109, the air/fuel ratio selection instruction signal and the degree of throttle opening signal are output to the engine controller 11, with the efficiency characteristic of the engine 2 changed to lean from the stoichiometric state, and the engine torque is changed to TE1 from TE2 (step 110) (the position (7) in FIG. 4).

Meanwhile, the value of the motor torque TM2 is increased so that the driving torque TO does not decrease when the engine torque decreases, that is, so that the driving torque TO, determined in accordance with the degree of accelerator opening, does not vary when the efficiency characteristic of the engine is changed.

In other words, the value of the driving torque TO from which the engine torque TE3 is subtracted is determined as the amended motor torque TM3 (step 111). The motor current instruction value IM4 which is set so as to change the motor torque to TM3 is generated (step 112) (point (8) in FIG. 4).

As described above, the battery state of charge SOC detected as a required running load has hysteresis and has different thresholds a1 and a2 (a1<a2) which are set, respectively, for when the battery state of charge decreases and for when the battery state of charge increases, so that hunting is prevented.

By the control operation as described above, the engine can be continuously driven in the most efficient driving state, for each efficiency characteristic, regardless of whether the required running load is heavy or light.

Next, the manner in which the above-described control routine acts on the drive train of, for example a hybrid vehicle, will be described with reference to FIG. 8.

FIG. 8 depicts one example of the drive train of a FF (Front engine and Front wheel drive) type vehicle. Conventionally, FF type vehicles have included both the type wherein the engine is mounted with its rotational shafts in a lateral direction and the type wherein the engine is mounted with its rotational shafts in a longitudinal direction. The above-described FF vehicles with laterally positioned engines, in turn, include both counter gear type vehicles which transmit the rotation of the engine to a differential device through a counter drive gear meshing with a counter driven gear, and chain type vehicles which transmit the rotation of the engine to the differential device through a chain. The counter gear type vehicles, in turn, include a midway positioned type in which the counter gear is midway positioned and a rear positioned type in which the counter gear is positioned at the rear end. The arrangement illustrated in FIG. 8 is a FF vehicle having its engine 2 mounted so that the rotational shaft is in a lateral direction, and is a counter gear type wherein the rotation of the engine 2 is transmitted to a differential device 21 through the counter gear, and is a midway positioned type vehicle provided with the counter gear at a midway point. The present invention is also applicable to vehicles other than the above-described types.

The drive train, other than the engine 2, is contained in a drive case 22, and the drive case 22 also contains the generator/motor 3, the differential device 21, a torque converter 23, the clutch 8 which is always engaged when the vehicle is in motion, a planetary gear unit 24, a brake B1, and a one-way clutch F1.

The generator/motor 3 has a stator 3a fixed in the drive case 22, a rotor 3b connected to a transmission shaft 25. The stator 3a has a coil 3c coiled around it, and can rotate the rotor 3b utilizing the driving current to the coil 3c. The rotation of the engine 2 and /or the generator/motor 3 is transmitted to a counter drive gear 26 fixed to the transmission shaft 25.

A driving shaft 27, receives the rotation output by the differential device 21 and transmits that rotation to the driving wheels on the right and left.

The planetary gear unit 24 is a simple planetary type, and includes a ring gear 24a, a pinion gear 24b, a sun gear 24c, and a carrier 24d supporting the pinion gear 24b.

The output shaft 5 of the engine 2 is connected to the input end of the torque converter 23, and an output shaft 28 of the torque converter 23 is connected to an input side of the clutch 8. The output side of the clutch 8 is connected to an input shaft 29 of the planetary gear unit 24, and the input shaft 29 is connected to the carrier 24d. The rotation of the sun gear 24c is selectively stopped by the brake B1. The one-way clutch F1 is provided between the sun gear 24c and the carrier 24d. One end of the transmission shaft 25 is connected to the ring gear 24a, and the other end of the transmission shaft 25 carries the counter drive gear 26 fixed thereto.

A counter drive shaft 31 is positioned proximate and parallel to the transmission shaft 25. The counter drive shaft 31 is provided with a counter driven gear 32 and an output gear 33. The counter driven gear 32 is engaged with counter drive gear 26, and the rotation of the counter drive gear 26 is transmitted to the output gear 33.

The rotation of the output gear 33 is transmitted to a large output gear 34 engaged with the output gear 33. The number of teeth of the large output gear 34 is more than that of the output gear 33, and a final speed reduction is provided by the combination of the output gear 33 and the large output gear 34. The slowed rotation of the large output gear 34 is transmitted to the differential device 21, differentiated and transmitted to the driving shafts 27 on the right and left. In the above-described arrangement, the drive output system 6 is defined by the counter drive shaft 31, the counter driven gear 32, the output gear 33, the large output gear 34, and the differential device 21.

In the defined drive system, as described above, when the engine 2 operates without supply of the driving current to the generator/motor 3, the rotation of the engine 2 is transmitted to the torque converter 23 through the output shaft 5, and further transmitted to the clutch 8 through the output shaft 28. When the clutch 8 is engaged, the rotation transmitted to the output shaft 28 is transmitted to the carrier 24d of the planetary gear unit 24 through the input shaft 29.

In the planetary gear unit 24, when the brake B1 is released, the one-way clutch F1 is locked by the rotation input to the carrier 24d and the planetary gear unit 24 is thus in a directly connected state. Accordingly, the rotation of the input shaft 29 is transmitted to the transmission shaft 25 as is. When the brake B1 is applied, the sun gear 24c is fixed, and the rotation, at an increased speed, is output from the ring gear 24a and transmitted to the counter drive gear 26 through the transmission shaft 25.

As described in the above, the rotation transmitted to the counter drive gear 26 is transmitted to the counter drive shaft 31 through the counter driven gear 32 with its speed reduced by the final speed reduction mechanism defined by the output gear 33 and the large output gear 34. At this time, the vehicle can be driven only by the engine 2, and regenerative current 1 can be generated in the generator/motor 3.

Next, when the clutch 8 is released and the generator/motor 3 is driven, the motor torque TM is generated by the generator/motor 3. The motor torque TM is output to the transmission shaft 25 and thereby transmitted to the counter drive gear 26. At this time, the vehicle can be driven by only the generator/motor 3.

When the engine 2 is operated with the clutch 8 engaged, and the generator/motor 3 is operative, the vehicle can be driven by the engine 2 and the generator/motor 3.

Next, a second embodiment of the hybrid vehicle will be described. In this second embodiment, only the control operation of the control system is changed and, therefore, only the control operation will be described in detail.

In the drive control of this second embodiment, the stored required running load is detected as the first load, and two loads are detected as the second loads from the momentary required running load or the stored required running loads other than the first load. When at least one of the detected values of the second loads exceeds a threshold value, a control operation is conducted so that the efficiency characteristic of the engine is changed.

This threshold value continually varies based upon the detected value of the first load. In this embodiment, the battery state of charge (%) is detected as the stored required running load as the first load, and the degree of accelerator opening at a given time (%) and the vehicle speed -km/h) are detected as the second loads.

FIG. 9 and FIG. 10 are graphs depicting the relationship among the battery state of charge SOC, threshold values b and c for the degree of accelerator opening α and the vehicle speed V. These relationships are prestored in the memory of the vehicle control device 10, and every time the detected battery state of charge SOC is input, the threshold b for the degree of accelerator opening and the threshold c of the vehicle speed are determined. FIG. 11 is a diagram illustrating the thresholds when the battery state of charge SOC shows a certain value. When the degree of accelerator opening and the vehicle speed are located within the region illustrated by o-k-l-m in the diagram, the engine is in a lean state, and when they are located outside the region, it is in a stoichiometric state. The area of region o-k-l-m decreases as the battery state of charge SOC decreases, and it increases as the battery state of charge SOC increases.

The control routine of the control system of the second embodiment will be described with reference to the time chart in FIG. 12, and the flow charts in FIG. 13 to FIG. 15.

In ordinary driving, the accelerator response control (step 201) and the threshold control (step 202) are conducted as FIG. 13 depicts. Since the operation of the accelerator response control is the same as that in the first embodiment, the description of it is abbreviated, and the threshold control will be described based upon FIG. 15. When the value detected from the battery sensor 14, which serves as a required running load detecting means, is input (step S21), the threshold value for the degree of accelerator opening b and the vehicle speed threshold value c are determined based upon the graphs illustrated in FIG. 9 and FIG. 10.

The accelerator response control (step S11 to S14) and the threshold control (step S21 to S 22) are always conducted successively while running. As illustrated at the position (1) in FIG. 12, when pressure is applied by stepping on the accelerator pedal and the degree of accelerator opening increases, the motor current instruction value IM increases corresponding to that increase.

The value of the degree of accelerator opening α detected by the accelerator sensor 13, is compared with the threshold b1 determined in the threshold control to determine whether or not it is the greater (step 203). When a is less than the threshold b1, a determination is made as to whether or not the value of the vehicle speed V, detected by the vehicle speed sensor 15, is more than the threshold value c1 (step 204). When V is less than the threshold c1, the accelerator response control and the threshold control are continued.

In the step 203 and the step 204, when the degree of accelerator opening is more than the threshold value b1, or the vehicle speed is more than the threshold value c1, the air/fuel ratio supplied to the engine 2 is changed to be stoichiometric (position (2) in FIG. 12), and the degree of engine throttle opening is determined so that the most efficient engine torque TE2 can be output when the engine 2 drives in a stoichiometric state (step 205). Based upon the determination of the step 205, the air/fuel ratio selection instruction signal and the degree of throttle opening signal are output to the engine control device 11, with the efficiency characteristic of the engine 2 changed from a lean state to a stoichiometric state, and the engine torque is changed from TE1 to TE2 (step 206) (position (3) in FIG. 12).

Meanwhile, the value of the motor torque TM1 is decreased so that the driving torque TO does not increase when the engine torque increases, that is, so that the driving torque TO, determined according to the degree of accelerator opening does not vary when the efficiency characteristic of the engine changes.

That is to say, the value of the driving torque TO from which the engine torque TE2 in a stoichiometric state is subtracted is determined as the amended motor torque TM2 (step 207). The motor current instruction value IM2 which is set to change the motor torque to TM2 is output (step 208) (the position (4) in FIG. 12).

When pressure on the accelerator is released and the degree of accelerator opening decreases, the motor torque TM2 is decreased (the position (5) in FIG. 12) by the accelerator response control (step 209), and the driving torque TO decreases. At the same time, each threshold value is determined by the threshold control (step 210) based upon the battery state of charge SOC.

In a stoichiometric state, it is determined whether or not the value of the degree of accelerator opening α, detected by the accelerator sensor 13, is less than the threshold value b2 determined in the threshold control (step 211). When it is more than the threshold b2, it is determined whether or not the vehicle speed is less than the threshold value c2 (step 212). When α is more than the threshold value c2, the accelerator response control and the threshold control are continued.

In the step 211 and the step 212, when the degree of accelerator opening is less than the threshold value b2, or the vehicle speed is less than the threshold value c2, as illustrated by the position (6) in FIG. 12, the air/fuel ratio supplied to the engine 2 is changed to be lean, and the degree of throttle opening of the engine 2 is determined so that the engine 2 can output the most efficient engine torque TE1 in the lean state.

Based upon the determination in step 213, the air/fuel ratio selection instruction signal and the degree of throttle opening signal are output to the engine controller 11, with the efficiency characteristic of the engine 2 changed to the lean state from the stoichiometric state, and the engine torque is changed from TE2 to TE1 (step 214) (the position (7) in FIG. 12).

Meanwhile, the motor torque TM2, as has been already described, decreases at a rate corresponding to the degree of accelerator opening, and so the motor torque TM3 is determined so that the driving torque TO does not vary as the engine torque TE decreases.

The value of the driving torque TO from which the engine torque TE3 in a lean state is subtracted is determined as the amended motor torque TM3 (step 215). Then the motor current instruction value IM3 which is set to change the motor torque to TM3 is output (step 216). On the time chart, the rate of decrease of the motor torque TM changes to that of a slowly decreasing value (the position (8) in FIG. 12).

As described in the above, the degree of accelerator opening and the vehicle speed which are both detected as the second required running load have hysteresis and different thresholds, b1, b2 (b1>b2), and c1, c2 (C1>C2) which are set, respectively, for increase and decrease, and hunting is thereby prevented.

By the above-described control operation, when the battery state of charge SOC is small, the stoichiometric region becomes large so that the battery state of charge SOC increases to quickly return to the original state. When the battery state of charge SOC is sufficient, the area of the lean region becomes large and the engine is controlled to operate mainly in the lean region with less fuel consumption. By this control operation, the overall energy efficiency of the hybrid vehicle is further improved. The case where the above-described control is not conducted is illustrated by a broken line.

Though the first and second embodiment described above have two efficiency characteristics of the engine, lean and stoichiometric, control may select the most efficient efficiency characteristic according to the required running load, with provision of a number of air/fuel ratios of the mixed gas supplied to the engine, and further, the air/fuel ratio may be controlled to successively change in accordance with change in the required running load. In this case, the engine is driven far more efficiently.

The detected required running loads include a momentary required running load and a stored required running load in the detected required running loads. The momentary required running load is the amount which is detected as a required running load at a given time, and can be detected as, for example, the vehicle speed (km/h), the degree of accelerator opening (%), the output value of the generator/motor 3 when driving as a motor (kw), the battery output value (kw, I, V). The stored required running load is a stored value for the running required load, for example, the accumulated value of the motor output (kwh), the accumulated value of the battery output (kwh, Ah), etc.

The value detected as the first load in the above-described embodiment may be the integrated value of the motor output of the generator/motor when operating as a motor (kwh), the integrated value of the battery output (kwh, Ah) or the battery state of charge. And the value detected as the second load may be the motor output value of the generator/motor when operated as a motor (kw), the output value of the charge means (kw, I, V), the accumulated value of the motor output (kwh), the accumulated value of the battery output (kwh, Ah), etc, in addition to the degree of accelerator opening (%) and the vehicle speed (km/h).

The required running load detecting means may be the battery sensor (means for detecting the battery state of charge), the accelerator sensor (means for detecting the degree of the accelerator opening), the vehicle speed sensor (means for detecting the vehicle speed), the motor current sensor (means for detecting the motor output), or the battery current-voltage sensor (means for detecting the battery output).

The gasoline engine 2 may be a variable displacement engine which can stop the operation of part of the cylinders instead of the above-described lean burn engine. In using a variable displacement engine, the cylinders are controlled so that, for example, when the required running load is low, operation of part of the cylinders is stopped, and when the required running load is high, all the cylinders are operated. A high expansion ratio engine, having a variable valve mechanism (miller cycle engine), may also be used. For example, by modifying the valve mechanism of the engine so that a number of compression ratios and expansion ratios can be set, the engine is controlled so as to drive with the most efficient engine torque for each set ratio. In concrete terms, when the required running load is low, the compression ratio is reduced compared to the expansion ratio, and when the required running load is high, the compression ratio is increased.

As the generator/motor 3, an alternating current induction motor or an alternating current magnet motor can be used instead of a direct current motor.

As the electricity storage means, a capacitor, a fly wheel battery, an oil pressure (or air pressure) accumulator, etc., can be used instead of the battery in each of the above-described embodiments. A capacitor is a condenser of large capacity and the residual electricity capacity can be known by detecting the voltage of the capacitor. A fly wheel battery is a battery which takes in and gives out electric power by driving and being regenerated by a fly wheel, utilizing a motor positioned on the same axle as the fly wheel, and the residual electrical capacity can be known by detecting the rotational frequency of the fly wheel. An oil pressure (or air pressure) accumulator is a battery which takes in and gives out electric power by taking in oil pressure (or air pressure), and releasing oil pressure utilizing an oil pressure (air pressure) pump connected to the accumulator, and the residual electrical capacity can be known by detecting the oil pressure (or air pressure). The battery may be a lead battery, a nickel-cadmium storage battery, a nickel-iron storage battery, a nickel-zinc storage battery, a lithium battery, etc.

Next, an embodiment having a different drive system than those of the above-described first and second embodiments will be described with reference to FIG. 16. In the drawing, 2 is an engine (EG), 41 is an output shaft which outputs the rotation generated by the engine 2, 42 is a planetary gear unit, serving as a differential gear device, for changing the speed of the rotation input through the output shaft 41, 43 is an output shaft by which the rotation at a speed established in the planetary gear unit 42 is output, 44 is a first counter drive gear fixed to the output shaft 43, and 45 is a generator (G) connected to the planetary gear unit 42 through a transmission shaft 46. The output shaft 43 is formed as a sleeve surrounding the output shaft 41. The first counter drive gear 44 is positioned closer to the engine 2 than to the planetary gear unit 42.

The planetary gear unit 42 consists of a sun gear S, a pinion gear P engaged with the sun gear S, a ring gear R engaged with the pinion gear, and a carrier CR rotatably supporting the pinion P.

The sun gear S is connected to a generator 45 through the transmission shaft 46, the ring gear R is connected to the first counter drive gear 44 through the output shaft 43, and the carrier CR is connected to the engine 2 through the output shaft 41.

The generator 45 consists of a rotor 47 which is fixed on the transmission shaft 46, a stator 48 positioned around the rotor 47, and a coil 49 coiled around the stator 48. The generator 45 generates electric power by the rotation received through the transmission shaft 46. The coil 49 is connected to the battery (not illustrated), and the electric current is supplied to the battery and stored therein.

A motor (M) 50 receives electric current from the battery and drives an output shaft 51. A second counter drive gear 52 is fixed to the output shaft 51. The motor 50 consists of a rotor 53 which is fixed to the output shaft 51, a stator 54 positioned around the rotor 53, and a coil 55 coiled around the stator 54. The motor 50 generates torque from the electric current supplied to the coil 55. Accordingly, the coil 55 is connected to a battery (not illustrated) and electric current is supplied from the battery.

A counter shaft 56 is provided in order to rotate the driving wheels (not illustrated) in the same direction as the rotation of the above-described engine 2, and a counter driven gear 57 is fixed to the counter shaft 56. With the counter driven gear 57 engaged with the first counter drive gear 44, and with the counter driven gear 57 engaged with the second counter drive gear 52, the rotation of the counter drive gear 44 and the rotation of the second counter drive gear 52 are transmitted to the counter driven gear 57.

A dif-pinion gear 58, with a smaller number of gear teeth than the counter driven gear 57, is fixed to the above-described counter shaft 56.

A dif-ring gear 59 is aligned on an axis parallel to the counter shaft 56, and the dif-ring gear 59 and the dif-pinion gear 58 are engaged. A differential device 60 is fixed to the dif-ring gear 59, and the rotation transmitted to the dif-ring gear 59 is differentially rotated by the differential device 60 and transmitted to the drive wheels. In the above-described arrangement, the drive output system (torque path) 6 is defined by the counter shaft 56, the counter driven gear 57, the dif-pinion gear 58, the dif-ring gear 59, and the differential device 60.

Since both the rotation generated by the engine 2 and the rotation generated by the motor 50 can be transmitted to the counter driven gear 57 as described above, the hybrid vehicle can be run in an engine drive mode in which only the engine 2 is operated, in a motor drive mode in which only the motor 50 is operated, and in an engine and motor drive mode in which both the engine 2 and the motor 50 provide drive power. The engine 2 can also be started by the generator 45.

In the drive system of this invention, using the control system 9 illustrated in FIG. 1, both the motor torque of the motor (M) 50 and the engine (EG) 2 are controlled. The torque which would otherwise change when the efficiency characteristic of the engine 2 is changed is maintained by adjusting the motor torque output by the motor 50.

Next, the drive system of the hybrid vehicle of a fourth embodiment will be described with reference to FIG. 17. The hybrid vehicle of this fourth embodiment is a series type hybrid vehicle which includes an engine 2, a generator 71 for generating electricity utilizing torque output by the engine 2, and a motor 72. An output shaft 73 of the motor 72 is connected to a differential device 74. Only the driving power of the motor 72 is transmitted to a pair of drive wheels 75 through the differential device 74.

The electric power generated by the generator 71 is stored in a battery 77 through a converter 76. The electric power stored in the battery 77 is supplied through an inverter 78 as the electric power to drive the motor 72.

In this series-type arrangement, in which the engine torque is not transmitted to the drive wheels, it is not necessary to consider torque fluctuations of the driving output system which might occur when the efficiency characteristic of the engine is changed. Accordingly, for the control of the motor 3, only the accelerator response control for obtaining a driving torque according to the degree of accelerator opening is utilized, and the control which changes the engine torque is not needed. The other control operations are the same as those described in the first embodiment.

By these controls, the most efficient efficiency characteristic can be selected for a required running load, and the engine is constantly driven in its most efficient state, regardless of the running load on the engine.

The hybrid vehicle of the present invention is not limited to the above-described arrangement, and it is applicable to other arrangements, for example, a series and parallel type of hybrid vehicle and so on. A series and parallel type of hybrid vehicle may be, for example, a vehicle which becomes a series type of hybrid vehicle by disconnecting a clutch between a generator and a transmission and becomes a parallel type of hybrid vehicle by connecting the clutch.

As described above, by utilizing the present invention, in which the most efficient efficiency characteristic can be selected according to the detected required running load, the engine can always maintain its most efficient driving state.

In the case of a parallel type of hybrid vehicle, change in the engine torque which occurs when the efficiency characteristic of the engine changes is compensated for by the motor torque, so that a good smooth feeling is maintained while running.

When the generator/motor is used as a motor, surplus torque can be generated, for example, while the vehicle is stopped, or when the driving torque is fully supplied by the engine torque, and this regenerative electric power can be stored in the electricity storage means. Accordingly, the state of charge of the electricity storage means can be maintained.

In an arrangement in which electricity is generated from a part of the engine torque by providing a separate generator, the generator can be continuously operated, so that the state of charge of the electricity storage means can be stabilized.

In the case of a series type of hybrid vehicle, the state of charge of the electricity storage means can be recovered quickly while always maintaining the most efficient driving condition for each efficiency characteristic by changing the efficiency characteristic according to change of the required running load.

What is claimed is:

1. A hybrid vehicle, comprising:

a combustion engine;

an electric motor;

an electricity storage means, electrically connected to said electric motor, for supplying electricity to said electric motor;

an output shaft connected to said engine and to said electric motor for receiving engine torque and motor torque, and for outputting the total of the engine torque and the motor torque as an output torque;

required running load detecting means for detecting a required running load;

engine controlling means for controlling said engine to operate in accordance with one of plural, mutually exclusive and predetermined engine-speed-torque relationships, in accordance with an instruction signal;

vehicle control means for selecting said one relationship from among said plural, mutually exclusive and predetermined relationships, based on the detected required running load, and for outputting said instruction signal, indicative of the selection, to said engine controlling means; and motor controlling means for compensating for a variance in the output torque which occurs as the engine speed-torque relationship is changed by said engine controlling means by controlling the motor torque output by said electric motor.

2. The hybrid vehicle according to claim 1, wherein said electricity storage means stores at least part of the output from the engine as regenerative energy from the electric motor.

3. The hybrid vehicle according to claim 1, further comprising a clutch positioned between said engine and said output shaft.

4. The hybrid vehicle according to claim 1, wherein the load detected by said required running load detecting means is at least one of the state of charge of the electricity storage means, the vehicle speed, the degree of accelerator opening, a motor output value, and an electricity storage means output value.

5. The hybrid vehicle according to claim 1, wherein said required running load detecting means detects the state of charge of said electricity storage means as a first load, and detects at least one of vehicle speed, the degree of accelerator opening, motor output, electricity storage means output, an accumulated value for motor output, and an accumulated value for said electricity storage means as second load, and wherein said engine controlling means changes the engine speed-torque relationship for said combustion engine when the detected value of said second load is over a threshold value and changes said threshold value based upon the detected value of said first load.

6. The hybrid vehicle according to claim 1, wherein said engine controlling means changes the engine speed-torque relationship by changing an air-fuel ratio of a mixed gas consisting of fuel and air supplied to said internal-combustion engine.

7. The hybrid vehicle according to claim 1, further comprising a generator for converting a part of the engine torque into electricity which is stored in said electricity storage means.

8. The hybrid vehicle according to claim 6, wherein said engine speed-torque relationships correspond, respectively, to plural, mutually exclusive ranges for the air-fuel ratio.

9. The hybrid vehicle according to claim 6 wherein said engine speed-torque relationships are two in number and correspond, respectively, to two mutually exclusive and predetermined ranges for the air-fuel ratio.

10. The hybrid vehicle according to claim 6, wherein the air-fuel ratio is increased by decreasing said fuel in accordance with an increase in the amount of the state of charge of said electricity storage means.

11. The hybrid vehicle according to claim 1, wherein said internal-combustion engine is a variable displacement engine.

12. The hybrid vehicle according to claim 5, wherein said threshold value is increased in accordance with an increase in the detected value of said first load.

13. The hybrid vehicle according to claim 7, further comprising a differential gear unit including a first element connected to said engine, a second element connected to said generator, and a third element connected to said electric motor and to said output shaft.

14. The hybrid vehicle according to claim 8, wherein said ranges for the air-fuel ratio include a first range defining a stoichiometric ratio of air to fuel and a second range defining an air to fuel ratio leaner than the air to fuel ratio of said stoichiometric range.

15. The hybrid vehicle according to claim 9 wherein said two ranges for the air-fuel ratio are a first range for a stoichiometric ratio of air to fuel and a second range for an air to fuel ratio leaner than said first range.

16. A hybrid vehicle, comprising:

a combustion engine wherein the compression ratio and the expansion ratio can be changed;

an electric motor;

an electricity storage means, electrically connected to said electric motor, for supplying electricity to said electric motor;

an output shaft connected to said engine and to said electric motor for receiving engine torque and motor torque, and for outputting the total of the engine torque and motor torque as output torque;

required running load detecting means for detecting a required running load;

engine controlling means for changing the compression ratio and the expansion ratio of said engine, in accordance with an instruction signal;

vehicle control means for selecting the compression ratio and the expansion ratio, based on the detected required running load, and for outputting said instruction signal, indicative of the selection, to said engine controlling means; and motor controlling means for compensating for a variance in the output torque, which occurs as the compression ratio and the expansion ratio are changed by said engine controlling means, by controlling the motor torque output by said electric motor.

* * * * *